US010635591B1

(12) United States Patent
Venkatachar et al.

(10) Patent No.: US 10,635,591 B1
(45) Date of Patent: Apr. 28, 2020

(54) SYSTEMS AND METHODS FOR SELECTIVELY FILTERING, BUFFERING, AND PROCESSING CACHE COHERENCY PROBES

(71) Applicant: Advanced Micro Devices, Inc., Santa Clara, CA (US)

(72) Inventors: Ashok T. Venkatachar, Fremont, CA (US); Anthony Jarvis, Boston, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/210,500

(22) Filed: Dec. 5, 2018

(51) Int. Cl.
*G06F 12/0831* (2016.01)
*G06F 11/30* (2006.01)
*G06F 12/0811* (2016.01)

(52) U.S. Cl.
CPC ...... *G06F 12/0835* (2013.01); *G06F 11/3037* (2013.01); *G06F 12/0811* (2013.01)

(58) Field of Classification Search
None
See application file for complete search history.

(56) References Cited

U.S. PATENT DOCUMENTS

| 6,668,309 | B2 * | 12/2003 | Bachand | G06F 12/0831 711/140 |
| 7,392,351 | B2 * | 6/2008 | Blumrich | G06F 12/0822 711/146 |
| 7,937,535 | B2 * | 5/2011 | Ozer | G06F 12/0822 711/146 |
| 2003/0070016 | A1 * | 4/2003 | Jones | G06F 12/082 710/107 |
| 2006/0095684 | A1 * | 5/2006 | Shen | G06F 12/0826 711/146 |

* cited by examiner

*Primary Examiner* — Michael Alsip
(74) *Attorney, Agent, or Firm* — Faegre Drinker Biddle & Reath LLP

(57) ABSTRACT

Systems and methods selectively filter, buffer, and process cache coherency probes. A processor includes a probe buffering unit that includes a cache coherency probe buffer. The probe buffering unit receives cache coherency probes and memory access requests for a cache. The probe buffering unit identifies and discards any of the probes that are directed to a memory block that is not cached in the cache, and buffers at least a subset of the remaining probes in the probe buffer. The probe buffering unit submits to the cache, in descending order of priority, one or more of: any buffered probes that are directed to the memory block to which a current memory access request is also directed; any current memory access requests that are directed to a memory block to which there is not a buffered probe also directed; and any buffered probes when there is not a current memory access request.

20 Claims, 9 Drawing Sheets

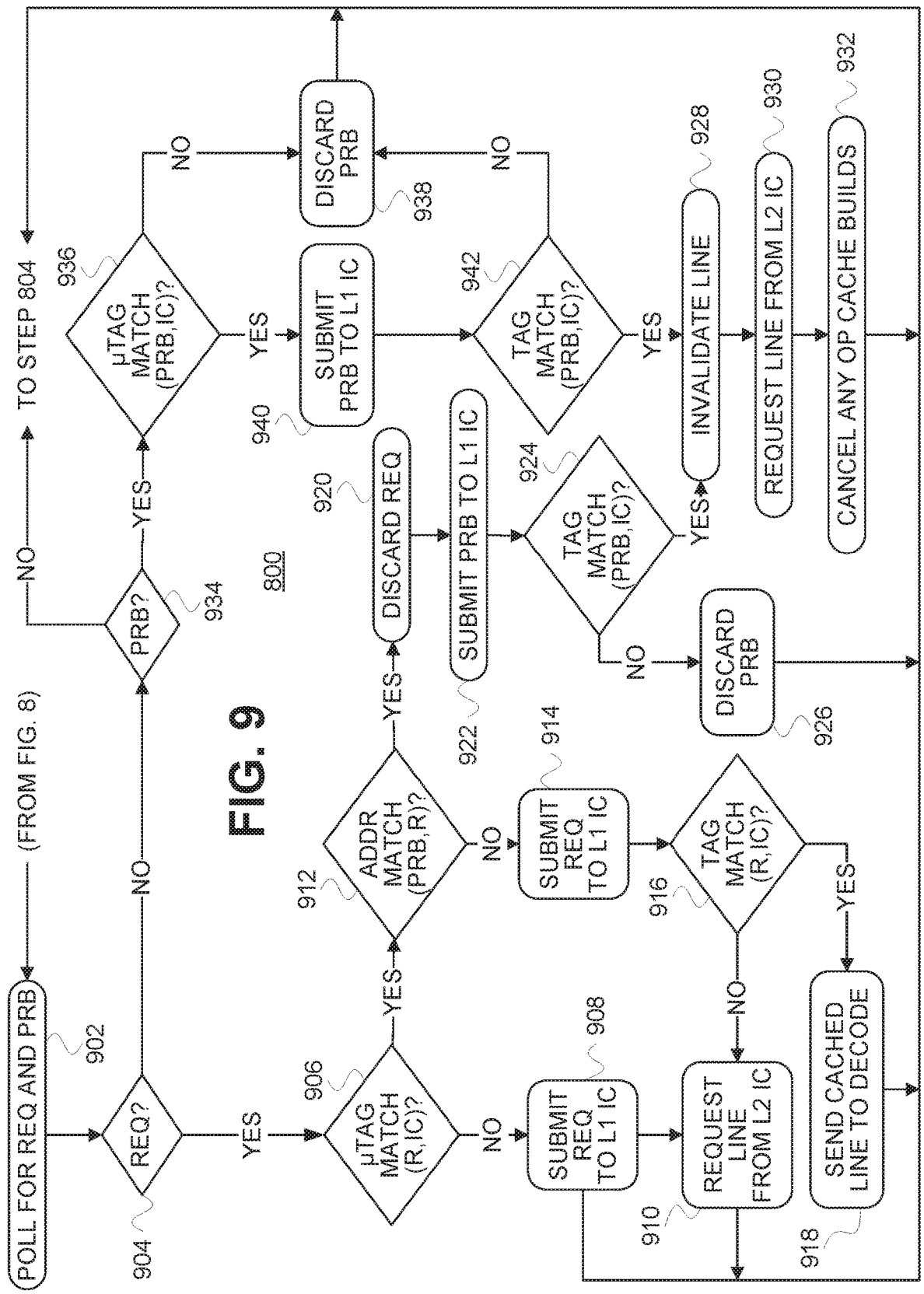

US 10,635,591 B1

SYSTEMS AND METHODS FOR SELECTIVELY FILTERING, BUFFERING, AND PROCESSING CACHE COHERENCY PROBES

BACKGROUND OF THE DISCLOSURE

In a typical processor, instructions are executed by an instruction pipeline that includes a branch prediction unit and a fetch unit collectively referred to as the front end of the pipeline, a decode unit, an execute/scheduler unit, and a load/store unit that includes a level one (L1) data cache that interfaces with a level two (L2) data cache. The fetch unit includes an L1 instruction cache that interfaces with an L2 instruction cache. One or more additional levels of data caches and/or instruction caches can also be implemented. A typical processor also includes a main memory having a physical address space that is organized into memory blocks. A typical cache includes a number of storage segments in which memory blocks from the main memory (or data blocks from another storage component) can be cached.

In a (single or multiple) processor system that includes a multi-level cache hierarchy, multiple valid instances of an instruction or other data item can exist simultaneously in different storage locations. Each instance of a particular instruction or data item corresponds to the same physical address and therefore to the same memory block. The modification of one instance of an instruction or data item often renders invalid at least one other instance of that same instruction or data item in another location, which is typically a cache.

Two types of instructions to which modification is permitted during execution are self modifying code (SMC), which is code that is modified within the same processor that is handling the modification, and cross modifying code (CMC), which is code that is modified at a processor other than the one that is handling the modification. When an instance of an instruction is modified, the component at which the modification occurs and/or is discovered typically sends an invalidation probe to each cache at which a now invalid instance of that instruction is (or at least potentially is) stored. An invalidation probe is a type of cache coherency probe, which is a message that is sent from a component in a processor to a cache in either the same or another processor to determine whether that cache is currently storing certain data and/or to indicate the state into which that cache should place that data (if present).

Upon receipt of an invalidation probe, a cache typically takes and/or triggers one or more actions to prevent, interrupt, and/or undo the execution of a now invalid instruction. Examples of these actions include invalidating any cached instance of the memory block that contains the instruction, canceling any pending operation cache (op cache) builds for the physical address of the instruction, refetching the corresponding memory block (from, e.g., a higher level cache), and triggering a resync of the pipeline.

There are different ways in which current implementations handle invalidation probes, each of which is wasteful in its own way of resources such as time, power, hardware (e.g., ports), and substrate surface area. Some are too overinclusive in selecting the cached memory blocks with respect to which they take responsive actions, resulting in the invalidation of more cached memory blocks than theoretically necessary and triggering too many resyncs. Others test every invalidation probe to make a conclusive determination as to whether the invalidation probe is directed to a physical address that is contained in a cached memory block before taking any responsive actions. This avoids the over-inclusive problem but comes at a cost of dedicating hardware and/or reducing throughput due to granting processing time and often priority to dispositively evaluating every invalidation probe. There is a need for more efficient and effective handling of cache coherency probes, including invalidation probes.

BRIEF DESCRIPTION OF THE DRAWINGS

A more detailed understanding may be had from the following description, which is presented by way of example in conjunction with the following drawings, in which like reference numerals are used across the drawings in connection with like elements.

FIG. 9 depicts the second of the two parts of the flowchart of FIG. 8, in accordance with an embodiment.

DETAILED DESCRIPTION

I. Introduction

Figure 1:
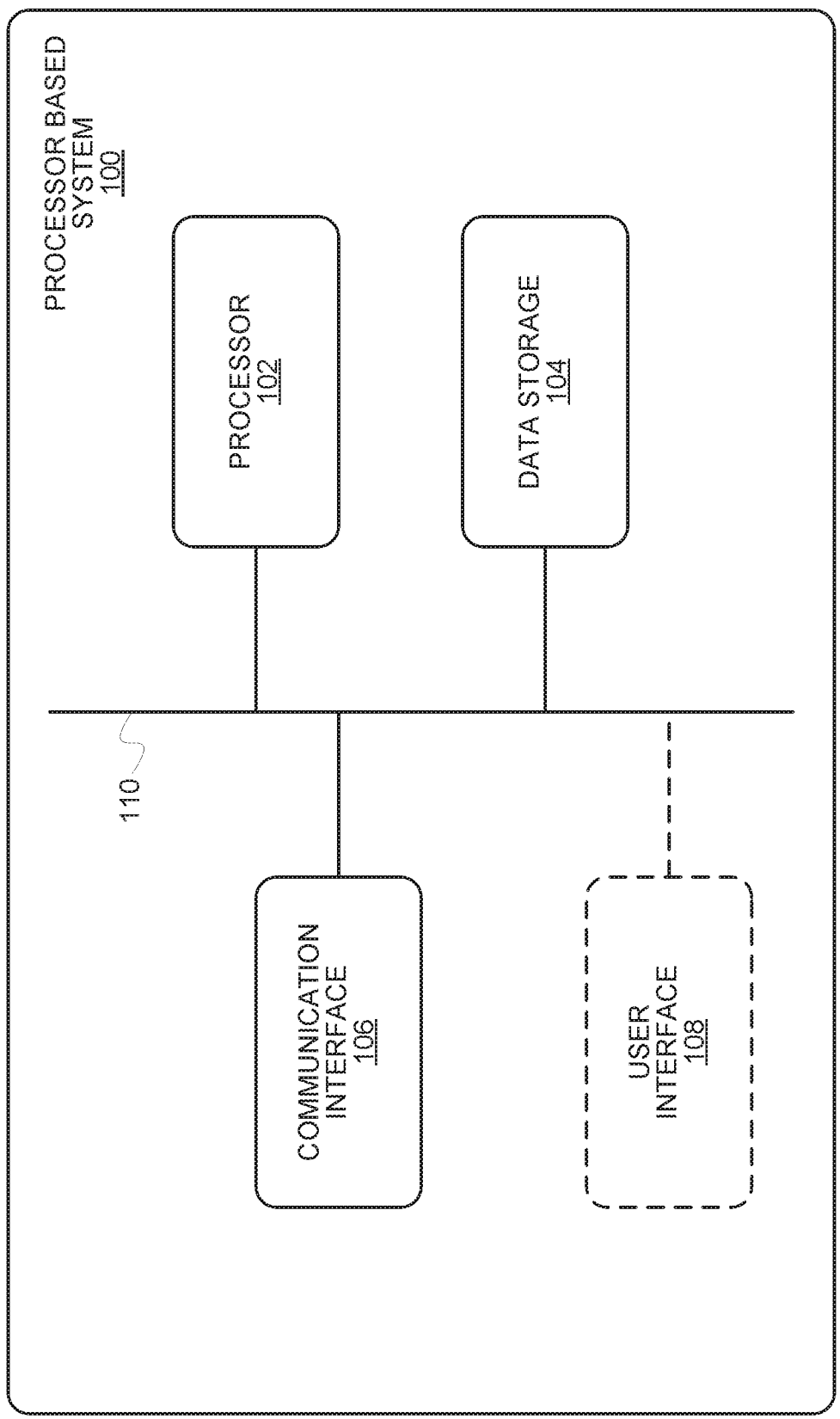
FIG. 1 depicts an example processor based device that includes an example processor, in accordance with an embodiment.

Disclosed herein are systems and methods for selectively filtering, buffering, and processing cache coherency probes. In an embodiment, a processor includes an L1 instruction cache and a probe buffering unit, both of which reside in a fetch unit. The probe buffering unit is communicatively connected with at least a branch prediction unit, the L1 instruction cache, and a unified L2 cache that includes both an L2 instruction cache and an L2 data cache. The processor also includes or is otherwise communicatively connected to a memory, and the probe buffering unit receives a flow of memory access requests from the branch prediction unit, and also receives a flow of incoming cache coherency probes from the L2 data cache. The probe buffering unit includes a cache coherency probe buffer. In the example described below, the cache coherency probes are invalidation probes, and the cache coherency probe buffer is an invalidation probe buffer.

Each memory access request in the flow of memory access requests and each incoming invalidation probe in the flow of incoming invalidation probes is directed to a memory block, perhaps by specifying a unique identifier of the memory block, a physical address of the memory block, or a physical address of an instruction that is contained within the memory block. In an embodiment, each memory access request specifies a physical address of an instruction that is within a memory block whereas each incoming invalidation probe specifies a unique identifier of a memory block. The probe buffering unit screens the incoming invalidation probes using a microtag (µtag) comparator or other screening mechanism. In an embodiment, a µtag comparator is a digital logic circuit that is operable to determine whether an invalidation probe or a memory access request is directed to a memory block that is possibly cached in the L1 instruction cache or instead to a memory block that definitely is not cached in the L1 instruction cache.

In an embodiment, any incoming invalidation probe that fails the µtag comparator is conclusively directed to a memory block that is not cached in the L1 instruction cache, and is therefore discarded by the probe buffering unit. In another embodiment, the memory block to which such an incoming invalidation probe is directed is requested by the L1 instruction cache from the L2 instruction cache. At least a subset of the remaining incoming invalidation probes— i.e., those that pass the µtag comparator and therefore are directed to memory blocks that are possibly cached in the L1 instruction cache—are buffered by the probe buffering unit in the invalidation probe buffer.

In an embodiment, the probe buffering unit receives the flow of memory access requests into a selection circuit, and also receives into the selection circuit a flow of buffered invalidation probes from the invalidation probe buffer. Responsive to selection logic that favors current memory access requests over buffered invalidation probes, the selection circuit selectively forwards current memory access requests and buffered invalidation probes to the L1 instruction cache. In an embodiment, the selection circuit does so via the µtag comparator. For a current memory access request, this is the first pass through the µtag comparator. For a buffered invalidation probe, this is the second pass through the µtag comparator.

Memory access requests that pass the µtag comparator are checked by a memory access request comparator, which determines whether there is a buffered cache coherency probe that is directed to the memory block to which the current memory access request is directed. If a matching buffered invalidation probe is found, the probe buffering unit submits that buffered invalidation probe to the L1 instruction cache for processing in lieu of the current memory access request, which is then discarded, perhaps to be resubmitted by the branch prediction unit at a later time. If, however, a matching buffered invalidation probe is not found, the probe buffering unit submits the current memory access request to the L1 instruction cache for processing. The L1 instruction cache processes each current memory access request that it receives through a full tag comparator, and it is only in the case of full tag matches that the L1 instruction cache fetches the instruction specified by the current memory access request from the corresponding cached memory block and sends that instruction to the decode unit.

Buffered invalidation probes that are forwarded by the selection circuit to the µtag comparator and that again pass the µtag comparator are submitted to the L1 instruction cache for processing, while those buffered invalidation probes that fail the µtag comparator are discarded by the probe buffering unit such that the L1 instruction cache is not burdened by having to process such invalidation probes. Among the benefits of processing invalidation probes through the µtag comparator a second time is that the contents of the L1 instruction cache may have changed between the time that the invalidation probe passed the µtag comparator to get into the invalidation probe buffer and the time that the invalidation probe is being rechecked by the µtag comparator. In particular, perhaps due to a natural write operation (i.e., a write operation to the L1 instruction cache from the L2 instruction cache) or the processing of another invalidation probe, it may no longer be the case that the memory block to which the invalidation probe is directed is possibly cached in the L1 instruction cache.

In an embodiment, similar to the manner in which the L1 instruction cache processes current memory access requests, the L1 instruction cache puts each buffered invalidation probe that it receives through a full tag comparator, and only applies buffered invalidation probes that are full tag matches of a cached memory block to the contents of the L1 instruction cache. In an embodiment, incoming invalidation probes only interrupt the normal flow of memory access requests when there is a buffered invalidation probe that is directed to the memory block to which the current memory access request is directed. In that case, it is more efficient to process that buffered invalidation probe than to process the current memory access request and then incur the costs of undoing that effort. In an embodiment, the normal flow of memory access requests is not interrupted or slowed down by invalidation probes in any other case.

In an embodiment, the L1 instruction cache only rarely applies (to the contents of the L1 instruction cache) invalidation probes that are directed to memory blocks that are only possibly cached in the L1 instruction cache. There is a probe buffer overflow case in which this can happen in accordance with an embodiment, but for the most part this is prevented by screening buffered invalidation probes that reach the L1 instruction cache with the full tag comparator.

In an embodiment, invalidation probes are handled without needing to dedicate an extra hardware port or use any additional substrate surface area in, e.g., the fetch unit, for determining whether an invalidation probe is directed to a memory block that is cached in the L1 instruction cache. Typical implementations of L1 instruction caches use a tag-read port to determine whether memory access requests are directed to memory blocks that are currently cached in the L1 instruction cache. An embodiment makes use of that existing hardware to evaluate invalidation probes as well.

In an embodiment, both memory access requests and buffered invalidation probes are routed via a common selection circuit to, and processed by, a common µtag comparator structure having one or more µtag comparator circuits. In an embodiment, a single µtag comparator circuit is used to screen incoming invalidation probes, buffered invalidation probes, and memory access requests. In another embodiment, a separate µtag comparator circuit is used for each of those screening functions. In some embodiments in which multiple µtag comparator circuits are used, efficiencies are gained by those circuits referencing a common data structure (e.g., table or array) that contains data indicative of the current contents of the L1 instruction cache. A single µtag circuit structure is present in many modern processor implementations and is typically used in those implementations to screen memory access requests prior to submitting those requests to the L1 instruction cache. In an embodiment, that existing structure is augmented with one or more additional μtag comparator circuits for the screening of incoming and/or buffered invalidation probes.

Various embodiments of the present systems and methods address a number of technical problems, including that prior implementations prioritize the processing of cache coherency probes such as invalidation probes over the processing of current memory access requests. This can result in probe thrashing, which can cause a significant slowdown in the processing of current memory access requests, which degrades the throughput of the processor.

One way in which embodiments of the present systems and methods provide a technical solution to at least this problem is by rerouting incoming invalidation probes via a filter (e.g., a μtag comparator) that reduces the number of incoming invalidation probes that are even potentially sent to the L1 instruction cache. A second way is by limiting the buffered invalidation probes that are sent to the L1 instruction cache to those that either (i) are directed to a memory block to which a current memory access request is also directed, in which case efficiencies are gained by processing that buffered invalidation probe to the L1 instruction cache in lieu of the current memory access request, or (ii) can efficiently and opportunistically occupy an open timeslot in the otherwise uninterrupted normal flow of memory access requests from the branch prediction unit. A third way is by, among the buffered evaluation probes that are actually sent to the L1 instruction cache, only applying to the contents of the L1 instruction cache those that are confirmed (by, e.g., full tag matching) to correspond to a memory block that is actually cached in the L1 instruction cache, in which case the buffered evaluation probe is applied only to that particular cached memory block.

One embodiment takes the form of a method, carried out by one or more processors, of selectively filtering, buffering, and processing cache coherency probes. The method includes receiving, at a probe buffering unit of a processor, cache coherency probes and memory access requests for a cache of the processor. The cache coherency probes and the memory access requests are directed to respective memory blocks of a memory. The probe buffering unit identifies and discards any of the cache coherency probes that are directed to a memory block that is not cached in the cache, and buffers at least a subset of the remaining cache coherency probes in a cache coherency probe buffer of the probe buffering unit. The probe buffering unit submits to the cache, in descending order of priority, one or more of: any buffered cache coherency probes that are directed to the memory block to which a current memory access request is also directed, any current memory access requests that are directed to a memory block to which there is not a buffered cache coherency probe also directed, and any buffered cache coherency probes when there is not a current memory access request.

In an embodiment, the probe buffering unit carries out the submitting step by iteratively polling for a current memory access request at a first input of a selection circuit of the probe buffering unit and for a buffered cache coherency probe at a second input of the selection circuit. If the polling indicates the presence of a current memory access request at the first input, the probe buffering unit picks the current memory access request from the first input for processing. If the polling does not indicate the presence of a current memory access request at the first input but does indicate the presence of a buffered cache coherency probe at the second input, the probe buffering unit picks the present buffered cache coherency probe from the second input for processing.

In an embodiment, processing the current memory access request includes the probe buffering unit determining whether the current memory access request is directed to a memory block that is possibly cached in the cache. If not, the probe buffering unit transmits the current memory access request to the cache. If so, the probe buffering unit determines whether there is a buffered cache coherency probe that is directed to the memory block to which the current memory access request is directed. If so, the probe buffering unit discards the current memory access request and transmits that buffered cache coherency probe to the cache. If not, the probe buffering unit transmits the current memory access request to the cache.

In an embodiment, processing the present buffered cache coherency probe includes the probe buffering unit transmitting the present buffered cache coherency probe from the selection circuit to the cache. In another embodiment, processing the present buffered cache coherency probe includes the probe buffering unit determining whether the present buffered cache coherency probe is directed to a memory block that is possibly cached in the cache. If so, the probe buffering unit transmits the present buffered cache coherency probe to the cache. If not, the probe buffering unit discards the present buffered cache coherency probe. In an embodiment, the probe buffering unit operates a memory access request comparator to determine whether there is a buffered cache coherency probe that is directed to the memory block to which a current memory access request is also directed.

In an embodiment, upon identification of a most recent cache coherency probe that is directed to a memory block that is possibly cached in the cache, the probe buffering unit detects that the cache coherency probe buffer is full. The probe buffering unit responsively submits directly to the cache either the most recent cache coherency probe or an already buffered cache coherency probe for application by the cache of the directly submitted cache coherency probe to any storage segments of the cache that possibly contain the memory block to which the directly submitted cache coherency probe is directed.

In an embodiment, the probe buffering unit operates a microtag (μtag) comparator to determine whether a cache coherency probe is directed to a memory block that is possibly cached in the cache or instead to a memory block that is not cached in the cache. In an embodiment, the cache coherency probes include at least one of an SMC invalidation probe and a CMC invalidation probe.

Another embodiment takes the form of a system that includes a processor and non-transitory data storage. The data storage contains instructions executable by the processor for causing the system to carry out any one or more of the methods of the preceding paragraphs.

Another embodiment takes the form of a processor that includes a memory, a cache for caching memory blocks of the memory, and a probe buffering unit that includes a cache coherency probe buffer. The probe buffering unit receives cache coherency probes and memory access requests for the cache. The cache coherency probes and the memory access requests are directed to respective memory blocks of the memory. The probe buffering unit identifies and discards any of the cache coherency probes that are directed to a memory block that is not cached in the cache, and buffers at least a subset of the remaining cache coherency probes in the cache coherency probe buffer. The probe buffering unit submits to the cache, in descending order of priority, one or more of:

any buffered cache coherency probes that are directed to the memory block to which a current memory access request is also directed, any current memory access requests that are directed to a memory block to which there is not a buffered cache coherency probe also directed, and any buffered cache coherency probes when there is not a current memory access request.

In an embodiment, the probe buffering unit also includes a selection circuit having a first selection circuit input and a second selection circuit input, as well as a selection logic circuit having a first selection logic circuit input and a second selection logic circuit input. The probe buffering unit receives, into both the first selection circuit input and the first selection logic circuit input, a memory access request flow that includes the received memory access requests, and also receives, into both the second selection circuit input and the second selection logic circuit input, a second flow that includes the buffered cache coherency probes. The probe buffering unit carries out the submitting step by operating the selection logic circuit to iteratively: poll for a current memory access request at the first selection logic circuit input and for a buffered cache coherency probe at the second selection logic circuit input. If the polling indicates the presence of a current memory access request at the first selection logic circuit input, then the probe buffering unit controls the selection circuit to pick the current memory access request from the first selection circuit input for processing. If the polling does not indicate the presence of a current memory access request at the first selection logic circuit input but does indicate the presence of a buffered cache coherency probe at the second selection logic circuit input, then the probe buffering unit controls the selection circuit to pick the present buffered cache coherency probe from the second selection circuit input for processing.

In an embodiment, the probe buffering unit includes a µtag comparator and a memory access request comparator. The probe buffering unit processes the current memory access request by operating the µtag comparator to determine whether the current memory access request is directed to a memory block that is possibly cached in the cache or instead to a memory block that is not cached in the cache. If the current memory access request is directed to a memory block that is not cached in the cache, the probe buffering unit transmits the current memory access request to the cache. If the current memory access request is directed to a memory block that is possibly cached in the cache, the probe buffering unit operates the memory access request comparator to determine whether there is a buffered cache coherency probe that is directed to the memory block to which the current memory access request is directed. If so, the probe buffering unit discards the current memory access request and transmits that buffered cache coherency probe to the cache. If not, the probe buffering unit transmits the current memory access request to the cache.

In an embodiment, the probe buffering unit processes the present buffered cache coherency probe by transmitting the present buffered cache coherency probe from the selection circuit to the cache. In another embodiment, the probe buffering unit includes a µtag comparator. The probe buffering unit processes the present buffered cache coherency probe by operating the µtag comparator to determine whether the present buffered cache coherency probe is directed to a memory block that is possibly cached in the cache or instead to a memory block that is not cached in the cache. If the present buffered cache coherency probe is directed to a memory block that is possibly cached in the cache, the probe buffering unit transmits the present buffered cache coherency probe to the cache. If the present buffered cache coherency probe is directed to a memory block that is not cached in the cache, the probe buffering unit discards the present buffered cache coherency probe.

In an embodiment, the probe buffering unit includes a memory access request comparator, which the probe buffering unit operates to determine whether there is a buffered cache coherency probe that is directed to the memory block to which a current memory access request is also directed. In an embodiment, the probe buffering unit includes a µtag comparator, which the probe buffering unit operates to determine whether a cache coherency probe is directed to a memory block that is possibly cached in the cache or instead to a memory block that is not cached in the cache.

Another embodiment takes the form of a non-transitory computer readable medium containing instructions executable by an integrated circuit (IC) manufacturing system to fabricate a processor that includes a memory, a cache for caching memory blocks of the memory, and a probe buffering unit that includes a cache coherency probe buffer. The probe buffering unit receives cache coherency probes and memory access requests for the cache. The cache coherency probes and the memory access requests are directed to respective memory blocks of the memory. The probe buffering unit identifies and discards any of the cache coherency probes that are directed to a memory block that is not cached in the cache, and buffers at least a subset of the remaining cache coherency probes in the cache coherency probe buffer. The probe buffering unit submits to the cache, in descending order of priority, one or more of: any buffered cache coherency probes that are directed to the memory block to which a current memory access request is also directed, any current memory access requests that are directed to a memory block to which there is not a buffered cache coherency probe also directed, and any buffered cache coherency probes when there is not a current memory access request.

Another embodiment takes the form of a processor that includes a memory, an instruction cache for caching memory blocks of the memory, and a probe buffering unit that includes an invalidation probe buffer. The probe buffering unit receives SMC invalidation probes and memory access requests for the instruction cache. The SMC invalidation probes and the memory access requests are directed to respective memory blocks of the memory. The probe buffering unit identifies and discards any of the cache coherency probes that are directed to a memory block that is not cached in the instruction cache, and buffers at least a subset of the remaining SMC invalidation probes in the invalidation probe buffer. The probe buffering unit submits to the instruction cache, in descending order of priority, one or more of: any buffered SMC invalidation probes that are directed to the memory block to which a current memory access request is also directed, any current memory access requests that are directed to a memory block to which there is not a buffered SMC invalidation probe also directed, and any buffered SMC invalidation probes when there is not a current memory access request.

In an embodiment, the probe buffering unit includes a memory access request comparator, and is configured to operate the memory access request comparator to determine whether there is a buffered invalidation probe that is directed to the memory block to which a current memory access request is also directed. In at least one embodiment, the probe buffering unit includes a µtag comparator, and is configured to operate the µtag comparator to determine whether an invalidation probe is directed to a memory block that is possibly cached in the instruction cache or instead to a memory block that is not cached in the instruction cache.

Further variations and permutations of the above-listed embodiments are described herein. Such variations and permutations can be implemented with respect to any embodiments, including with respect to any method embodiments, any system embodiments, and any IC fabrication instruction computer readable medium (CRM) embodiments, independent of the type of embodiment in connection with which such variations and permutations are primarily described herein. Furthermore, this flexibility and cross-applicability of embodiments is present in spite of the use of any slightly different language (e.g., process, method, steps, functions, set of functions, and the like) to describe and/or characterize such embodiments.

For the purposes of promoting an understanding of the principles of the present disclosure, reference is made to the embodiments illustrated in the drawings, which are described below. The embodiments disclosed herein are not intended to be exhaustive or to limit the present disclosure to the precise form disclosed in the following detailed description. Rather, the embodiments are chosen and described so that others may utilize their teachings. Therefore, no limitation of the scope of the present disclosure is thereby intended.

In some instances throughout this disclosure and in the claims, numeric modifiers such as first, second, third, and fourth are used in reference to various components, data such as various identifiers, and/or other elements. Such use is not intended to denote or dictate a specific or required order of the elements. Rather, this numeric terminology is used to assist the reader in identifying the element that is being referenced and in distinguishing that element from other elements, and should not be narrowly interpreted as insisting upon any particular order.

II. Example Architecture

A. Example Processor Based Device

FIG. 1 depicts an example processor based device 100 that includes an example processor 102, a data storage 104, a communication interface 106, and an optional user interface 108, all of which are communicatively interconnected via a bus structure 110. The processor based device 100 can include different components, as the depiction in FIG. 1 is by way of example. As examples, the processor based device 100 can be a computer, a personal computer, a desktop computer, a workstation, a laptop computer, a tablet, a cellular phone, a smartphone, a wearable, a personal digital assistant (PDA), a set top box, a gaming console, a gaming controller, a server, an Internet of Things (IoT) device, or any other processor based device.

Figure 2:
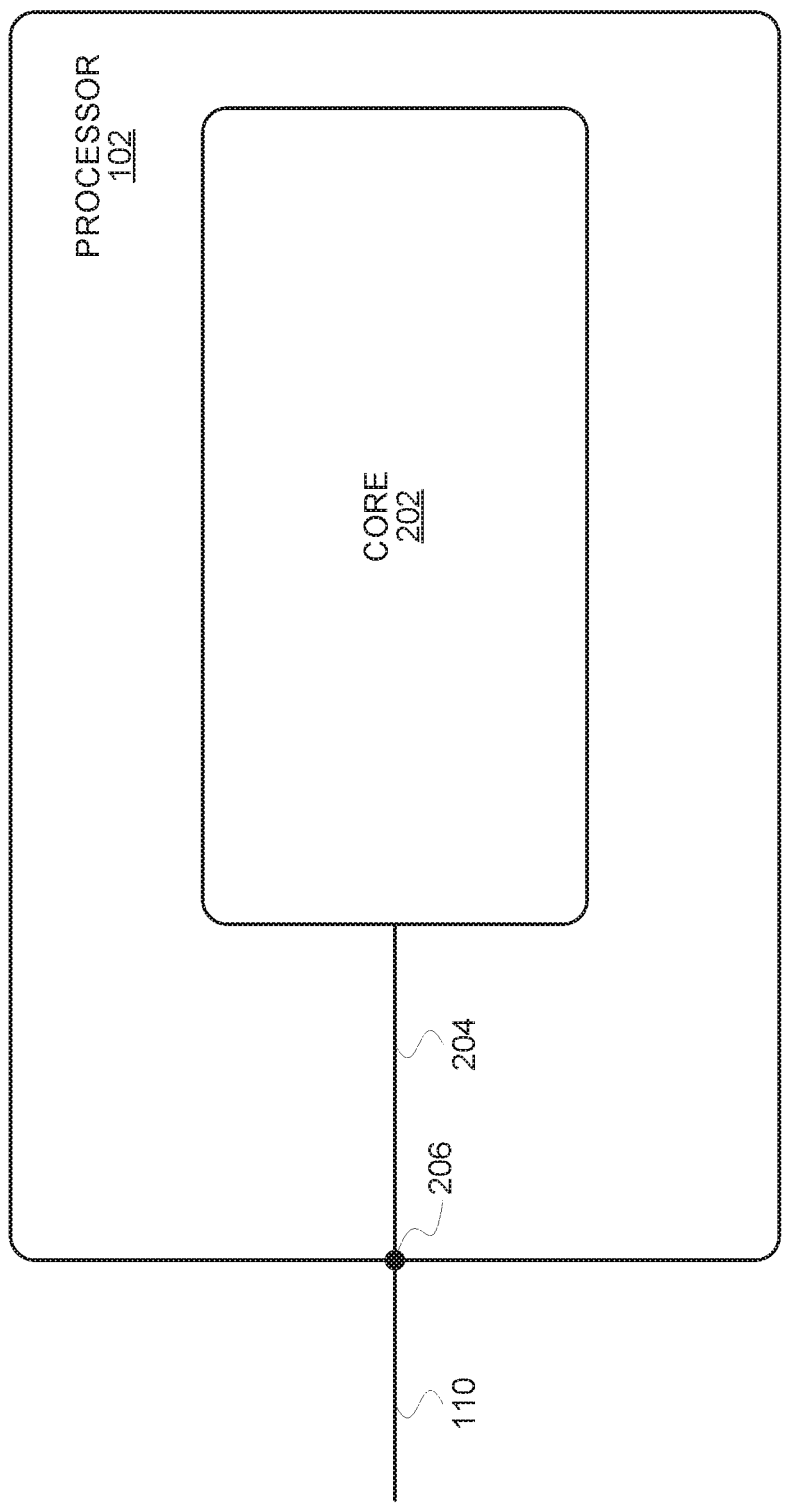
FIG. 2 depicts an example single core implementation of the example processor of FIG. 1, in accordance with an embodiment.
Figure 3:
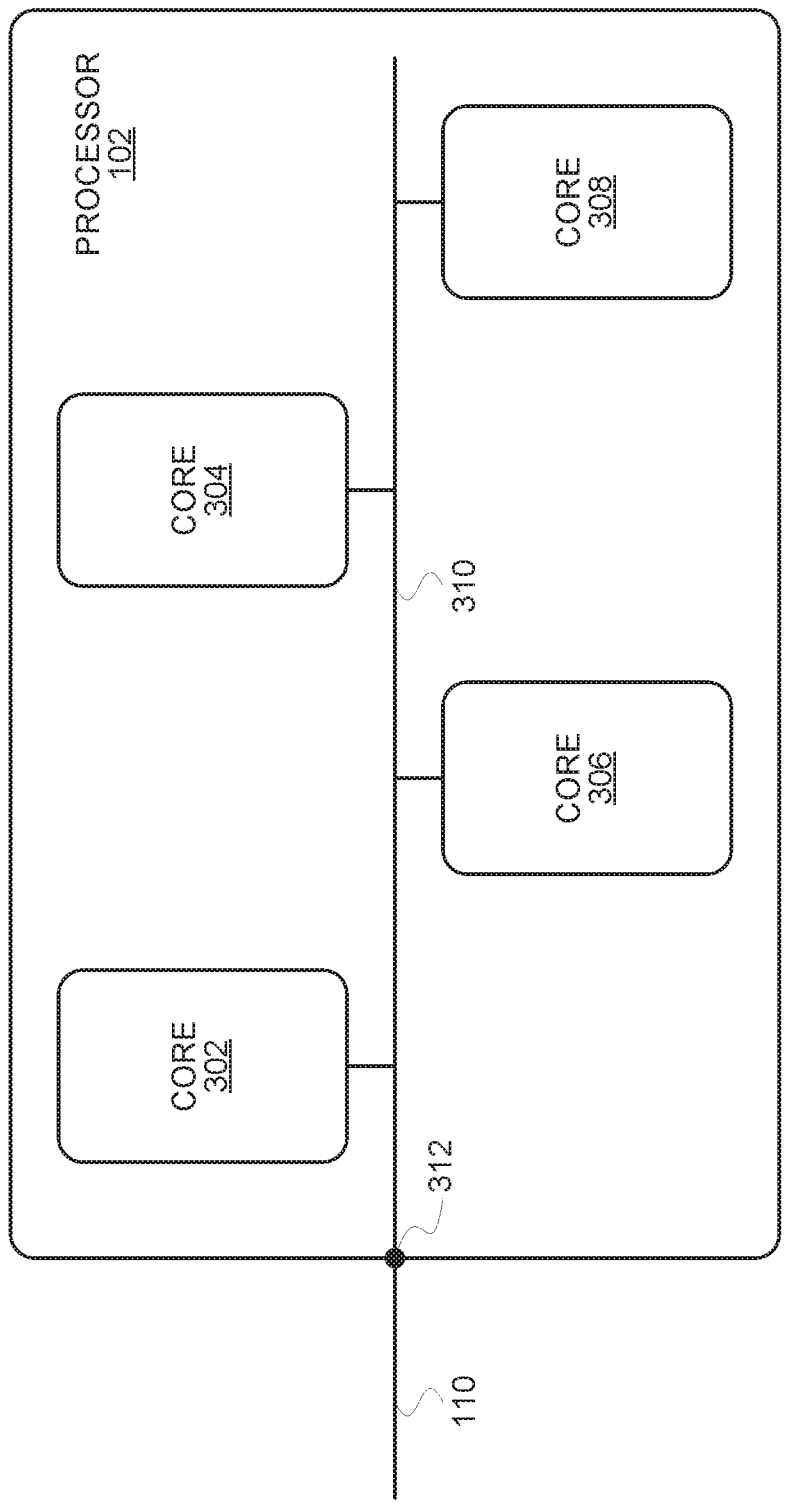
FIG. 3 depicts an example multiple core implementation of the example processor of FIG. 1, in accordance with an embodiment.

The processor 102 can be a microprocessor, a central processing unit (CPU), a graphics processing unit (GPU), one or more processor cores or any other type of processor that implements an instruction pipeline and is equipped and configured to embody and/or carry out one or more embodiments of the present systems and methods. FIG. 2 depicts an implementation in which the processor 102 has one core 202, which is communicatively connected via a data link 204 to the bus structure 110 at a connection point 206. FIG. 3 depicts an implementation in which the processor 102 includes four cores—i.e., a core 302, a core 304, a core 306, and a core 308, all of which are communicatively connected to one another via an intraprocessor bus structure 310 and in turn with the bus structure 110 at a connection point 312. And while the four cores 302-308 are depicted in FIG. 3, a multicore arrangement can include any number of processors having any number of cores.

The data storage 104 can be any type of non-transitory data storage such as a random access memory (RAM), a read only memory (ROM), an erasable programmable ROM (EPROM), an electrically erasable programmable ROM (EEPROM), flash memory, magnetic disk, optical disk, and/or the like. In an embodiment, the communication interface 106 includes a wired-communication interface for communicating with one or more other processor based devices and/or other communication entities according to a wired-communication protocol such as Ethernet. In an embodiment, instead of or in addition to the wired-communication interface, the communication interface 106 includes a wireless-communication interface that includes the corresponding hardware, firmware, and the like for communicating wirelessly with one or more devices and/or other entities using one or more wireless-communication protocols such as Wi-Fi, Bluetooth, LTE, WiMAX, CDMA, and/or the like.

The optional user interface 108 is not present in all instances of the processor based device 100. For example, in some instances in which the processor based device 100 is a network server, a user interface is not present. In instances in which the optional user interface 108 is present, it includes one or more input devices and/or one or more output devices. The one or more input devices can include a touchscreen, a keyboard, a mouse, a microphone, and/or the like, while the one or more output devices can include a display (e.g., a touchscreen), one or more speakers, one or more indicator light emitting diodes (LEDs), and/or the like.

B. Example Core

Figure 4:
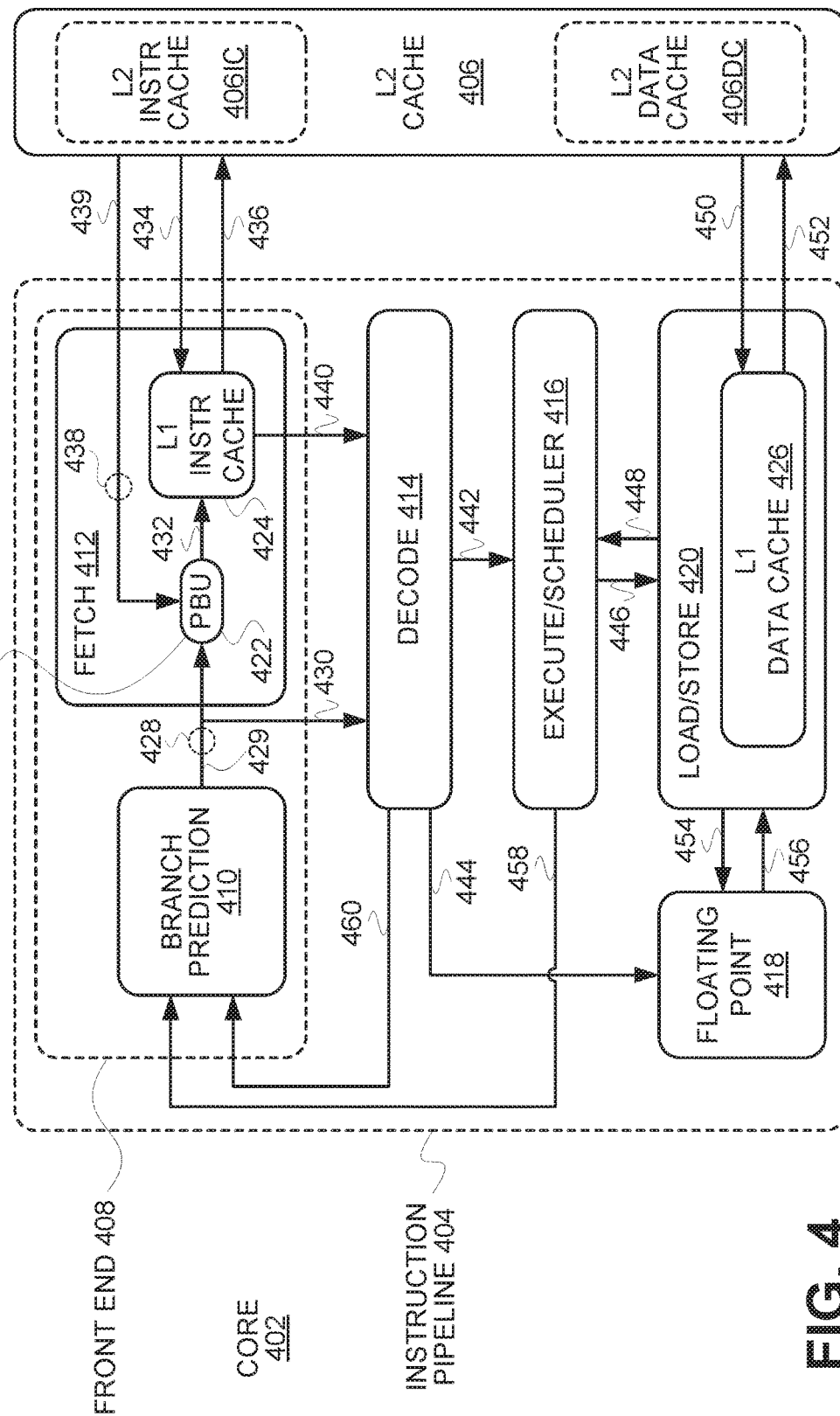
FIG. 4 depicts an example core that includes an example probe buffering unit and an example level one (L1) instruction cache, in accordance with an embodiment.

FIG. 4 depicts an example core 402 that includes an example probe buffering unit 422 in accordance with the present systems and methods. The core 402 includes an instruction pipeline 404 and an L2 cache 406. The instruction pipeline 404 includes an L1 instruction cache 424 and an L1 data cache 426. The L2 cache 406 includes an L2 instruction cache 406IC and an L2 data cache 406DC. The core 402 includes a front end 408 that includes a branch prediction unit 410 and a fetch unit 412 (that includes the probe buffering unit 422 and the L1 instruction cache 424), as well as a decode unit 414, an execute/scheduler unit 416, a floating point unit 418, and a load/store unit 420. The branch prediction unit 410 receives redirects from the decode unit 414 via a data link 460, receives redirects from the execute/scheduler unit 416 via a data link 458, and outputs—via a data link 429—a memory access request flow 428, a copy of which is also transmitted to the decode unit 414 via a data link 430.

The probe buffering unit 422 receives the memory access request flow 428 from the branch prediction unit 410 via the data link 429, and also receives—via a data link 439—an incoming invalidation probe flow 438 from the L2 cache 406. In an embodiment, the incoming invalidation probe flow 438 includes invalidation backprobes that are generated by the L1 data cache 426 and sent to the probe buffering unit 422 via the L2 cache 406. The probe buffering unit 422 identifies and discards any incoming invalidation probes that are directed to memory blocks that are not cached in the L1 instruction cache 424, buffers at least a subset of the remaining invalidation probes in a probe buffer, and selectively prioritizes and processes to the L1 instruction cache 424 both (i) memory access requests received in the memory access request flow 428 and (ii) the buffered cache coherency probes. The probe buffering unit 422 selectively outputs memory access requests and buffered invalidation probes to the L1 instruction cache 424 via a data processing link 432.

Figure 7:
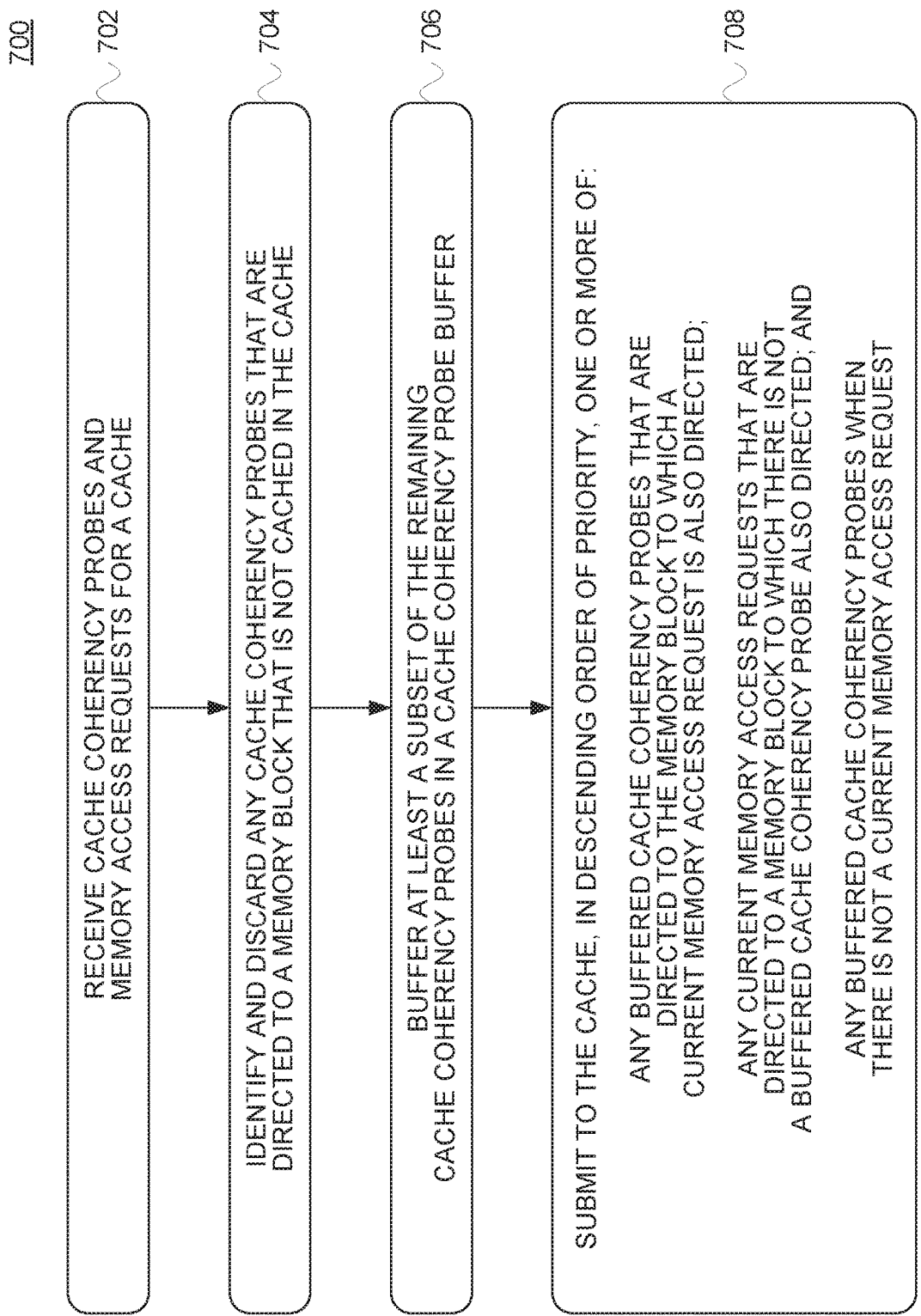
FIG. 7 depicts an example method, carried out by an example probe buffering unit, of selectively filtering, buffering, and processing cache coherency probes, in accordance with an embodiment.

In an embodiment, the probe buffering unit 422 is configured to carry out the method 700 of FIG. 7. In various other embodiments, the probe buffering unit 422 is configured to carry out any one or more of the variations of the method 700 that are described herein, or any one or more of the functions described herein as being carried out by a probe buffering unit. The probe buffering unit 422 is implemented as a deterministic digital logic circuit in some embodiments and as a single state machine or combination of multiple state machines in other embodiments.

In an embodiment, the L1 instruction cache 424 is a set-associative instruction cache that includes a plurality of storage segments that are referred to as "ways," each of which can be used to cache a memory block from, e.g., a main memory (not depicted) that in an embodiment is organized into a 64-byte blocks. In some embodiments, the L1 instruction cache 424 is an 8-way set-associative instruction cache, but can be any n-way (e.g., 4-way) set-associative instruction cache or an instruction cache having a different architecture. In an embodiment, the size of each way in the L1 instruction cache 424 is also 64 bytes, such that the L1 instruction cache 424 is able to cache, in any one or more of such ways, a 64-byte memory block that contains one or more instructions that can each be a single byte or multiple bytes in length.

In an embodiment, the L1 instruction cache 424 performs page translations, fetches and caches memory blocks from the L2 instruction cache 406IC as predicted by the branch prediction unit 410, provides fetched instruction bytes to the decode unit 414 via a data link 440, and prefetches instructions. Memory blocks that correspond to memory access requests that miss at the L1 instruction cache 424 are fetched from the L2 instruction cache 406IC via data links 434 and 436 or, if not resident in the L2 instruction cache 406IC, from an L3 (or higher level) instruction cache, if present. Memory blocks that correspond to memory access requests that miss at all levels of the instruction cache hierarchy are retrieved from the main memory.

The decode unit 414 receives a copy of the memory access request flow 428 via the data link 430, receives fetched instruction bytes from the L1 instruction cache 424 via the data link 440, and transmits redirects to the branch prediction unit 410 via the data link 460. The decode unit 414 also transmits decoded instructions for floating point operations to the floating point unit 418 via a data link 444, and transmits decoded instructions for arithmetic operations, load/store operations, and/or the like to the execute/scheduler unit 416 via a data link 442. The execute/scheduler unit 416 receives the decoded instructions from the decode unit 414 via the data link 442, transmits redirects via the data link 458 to the branch prediction unit 410, and exchanges load/store data with the load/store unit 420 via data links 446 and 448. The floating point unit 418 receives the floating point instructions via the data link 444 from the decode unit 414, receives floating point operands from the load/store unit 420 via a data link 454, and transmits floating point operation results to the load/store unit 420 via a data link 456.

The load/store unit 420 exchanges load/store data with the execute/scheduler unit 416 via the data links 446 and 448, transmits floating point operands to the floating point unit 418 via the data link 454, and receives floating point operation results from the floating point unit 418 via the data link 456. The load/store unit 420 includes the L1 data cache 426, which uses a data link 452 to transmit data requests to the L2 data cache 406DC and also to transmit invalidation backprobes to the L1 instruction cache 424 via the L2 cache 406 and the data link 434, and which uses a data link 450 to receive data fills from the L2 data cache 406DC.

One example situation that results in an invalidation backprobe being sent to the probe buffering unit 422 involves two initially valid instructions that both correspond to the same physical address (and therefore to the same memory block) existing simultaneously: one in the load/store unit 420 and the other in the L1 instruction cache 424. In this example, the instruction in the load/store unit 420 is an instruction to store data. Upon arriving at that store instruction, the load/store unit 420 determines that the store instruction has a particular flag set. This flag is referred to in some implementations as a danger bit, and indicates the possibility that the L1 instruction cache 424 currently contains a memory block that includes the physical address to which the store instruction in the load/store unit 420 also corresponds. Upon determining that this store instruction has this flag set, the load/store unit 420 sends an invalidation backprobe—directed to the memory block that contains that physical address—to the L1 instruction cache 424 via the L2 cache 406.

C. Example Probe Buffering Unit

Figure 5:
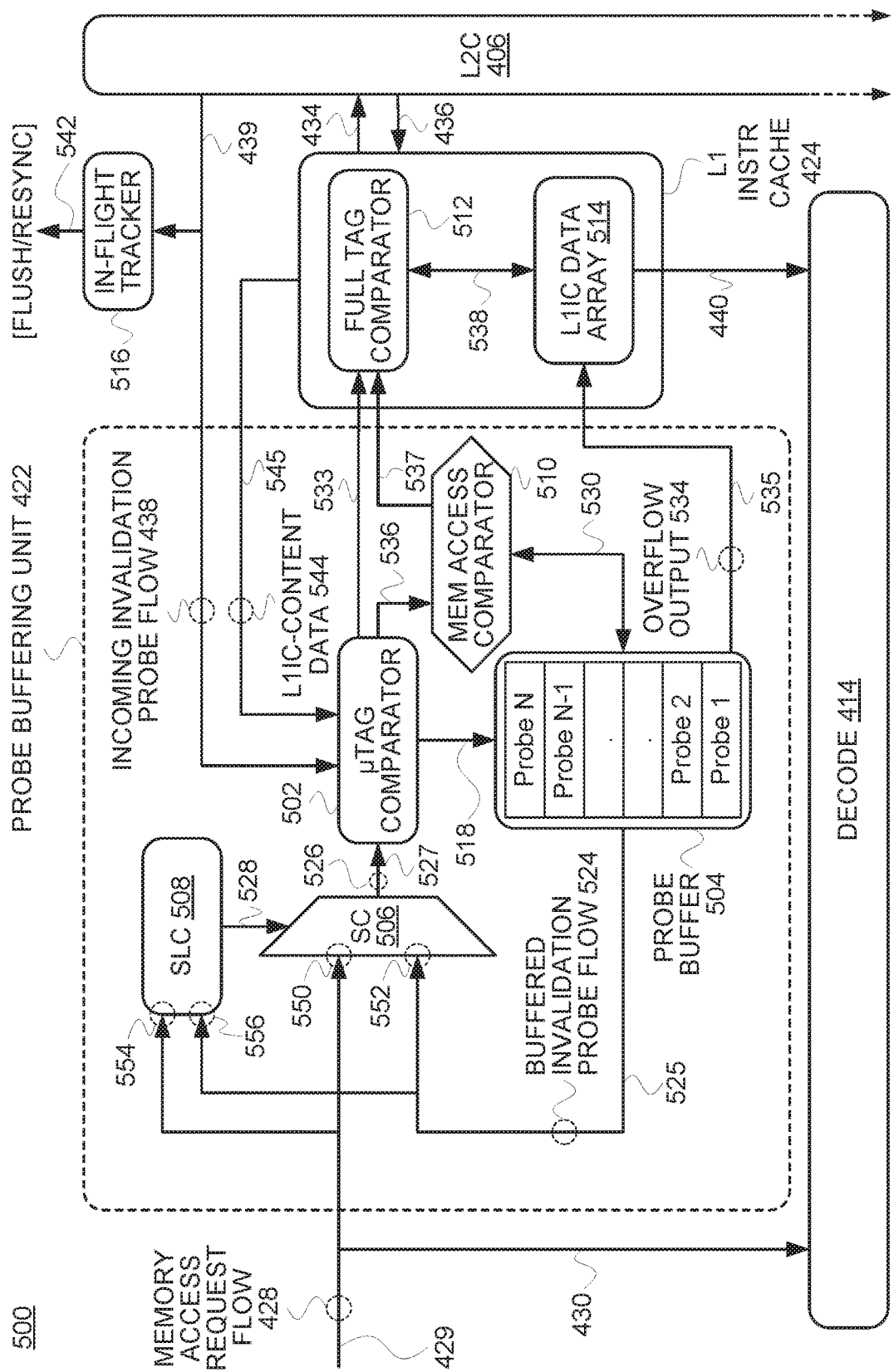
FIG. 5 depicts an example architecture of the example probe buffering unit and the example L1 instruction cache of FIG. 4, in accordance with an embodiment.

FIG. 5 depicts an example architecture 500 of the example probe buffering unit 422 and the example L1 instruction cache 424. The probe buffering unit 422 includes a µtag comparator 502, an invalidation probe buffer 504, a selection circuit 506, a selection logic circuit 508, and a memory access request comparator 510. The L1 instruction cache 424 includes a full tag comparator 512 that is connected via a data link 538 with an L1 instruction cache data array 514.

The µtag comparator 502 receives the incoming invalidation probe flow 438 via the data link 439, and also receives—via a data link 545—L1 instruction cache content data 544, which informs the µtag comparator 502 of the contents of the L1 instruction cache 424. The µtag comparator 502 also receives a selection circuit output 526 via a data link 527 from the selection circuit 506. In any particular clock cycle, the selection circuit output 526 contains (i) a current memory access request picked by the selection circuit 506 from the memory access request flow 428, (ii) a buffered invalidation probe picked by the selection circuit 506 from a buffered-probe flow 524 (which is a flow of buffered invalidation probes from the invalidation probe buffer 504), or (iii) neither. The µtag comparator 502 has three outputs: a data link 518 to the invalidation probe buffer 504, a data link 533 to the full tag comparator 512, and a data link 536 to the memory access request comparator 510. The memory access request comparator 510 is connected via a data link 537 to the full tag comparator 512. The data processing link 432 of FIG. 4 includes the memory access request comparator 510 and the data links 533, 536, and 537.

The selection circuit 506 and the selection logic circuit 508 both receive the memory access request flow 428 (via the data link 429) and the buffered-probe flow 524 (via a data link 525). The memory access request flow 428 is received by the selection circuit 506 on a first selection circuit input 550 and by the selection logic circuit 508 on a first selection logic circuit input 554. The buffered-probe flow 524 is received by the selection circuit 506 on a second selection circuit input 552 and by the selection logic circuit 508 on a second selection logic circuit input 556. The selection circuit 506 receives a selection circuit control signal 528 from the selection logic circuit 508. The selection circuit 506 transmits the selection circuit output 526 to the µtag comparator 502 via the data link 527.

In an embodiment, each memory access request is directed to a memory block by specifying a physical address of an instruction that is contained in the memory block, where each such instruction can be a single byte or multiple bytes in length, and each physical address is structured as follows:

Physical Address (PA): [TAG][INDEX][OFFSET]

where the sizes of the TAG field, the INDEX field, and the OFFSET field are $TAG_{length}$ bits, $INDEX_{length}$ bits, and $OFFSET_{length}$ bits, respectively. Each physical address therefore includes a total of $PA_{length}$ bits, equal to the sum of $TAG_{length}$, $INDEX_{length}$, and $OFFSET_{length}$. In such an embodiment, the size of the memory blocks (i.e., the block size) of the memory, as well as the size of each way (i.e., the way size) of the L1 instruction cache 424, is $2^{OFFSETlength}$ bytes.

Taken together, the [TAG][INDEX] portion of a physical address of an instruction is a unique identifier of the memory block within which that instruction is located. The OFFSET field specifies the location of the instruction in that memory block as a physical offset from the beginning of the memory block. Thus, within the section of memory that is used for storing instructions, a physical address with all 0s in the OFFSET field is both the physical address of a memory block and the physical address of the first instruction in that memory block. In an embodiment, each invalidation probe is directed to a memory block by specifying the unique [TAG] [INDEX] identifier of the memory block.

In an embodiment, the L1 instruction cache 424 is an n-way set-associative cache, which means that its cache lines are arranged in sets that have exactly n ways in each set. There is a total of "S" (equal to $2^{INDEXlength}$) such sets and therefore a total of "L" (equal to n*S) ways in the L1 instruction cache 424. Architecturally, the L1 instruction cache 424 maintains these L ways in the L1 instruction cache data array 514, in which the sets are indexed as set[0] through set[S−1] and in which the ways within each set are indexed as way[0] through way[n−1]. In some embodiments, the L1 instruction cache data array 514 also includes the corresponding TAG value stored in association with each way in which a memory block is currently cached. In other embodiments, the corresponding TAG values of the cached memory blocks are not stored in the L1 instruction cache data array 514.

In an example embodiment, the L1 instruction cache 424 is an 8-way set-associative cache (i.e., n=8), $PA_{length}$=52, $TAG_{length}$=40, $INDEX_{length}$=6, and $OFFSET_{length}$=6. As such, with the corresponding bit indices shown in the second row, each 52-bit physical address is made up of bits numbered [51:0] that are delineated as follows:

| Physical Address (PA): | [TAG] | [INDEX] | [OFFSET] |
|---|---|---|---|
| [51:0]: | [51:12] | [11:6] | [5:0] |

Because $OFFSET_{length}$=6, the block size and the way size are both equal to $2^6$ (i.e., 64) bytes. Additionally, because n=8 and $INDEX_{length}$=6, the ways in the L1 instruction cache 424 are arranged in sets of 8, and there are $2^6$ such sets (i.e., S=64) and a total of 512 ways in the L1 instruction cache 424 (i.e., L=512, computed as 8*64 (i.e., n*S)). Although it is true in this example, it is not required that $INDEX_{length}$ equal $OFFSET_{length}$. Each of these 512 ways in the L1 instruction cache data array 514 can be used to cache a 64-byte memory block. These 512 ways are organized into 64 sets that are numbered set[0] through set[63]. Within each of those sets, the 8 ways are numbered way[0] through way[7].

In order to cache a memory block, represented by the unique identifier [TAG] [INDEX], that the L1 instruction cache 424 receives from the L2 instruction cache 406IC, the L1 instruction cache 424 uses a cache line replacement algorithm such as random selection, least recently used (LRU), or the like to select one of the 8 ways within set[INDEX]. The L1 instruction cache 424 then overwrites that selected way (referred to herein as "WAY") in set [INDEX] in the L1 instruction cache data array 514 with the data from the received memory block represented by [TAG] [INDEX].

In addition to the L1 instruction cache 424, which maintains the L1 instruction cache data array 514, the µtag comparator 502 and the full tag comparator 512 also maintain their own respective array of 64 (i.e., S) sets that each contain 8 (i.e., n) ways. These two entities maintain different types of data in their respective arrays, each tailored to their particular functions. Both arrays, however, are organized according to the same set and index system as the L1 instruction cache data array 514. The array maintained by the µtag comparator 502 is referred to as the µtag array, and the array maintained by the full tag comparator 512 is referred to as the tag array. To enable the µtag comparator 502 and the full tag comparator 512 to keep their respective arrays current, the L1 instruction cache 424—upon caching a memory block in the L1 instruction cache data array 514—transmits the corresponding TAG, INDEX, and WAY values to the µtag comparator 502 and the full tag comparator 512. The µtag comparator 502 and the full tag comparator 512 process this data and update their respective arrays.

When the µtag comparator 502 receives a {TAG, INDEX, WAY} tuple as a result of the L1 instruction cache 424 caching memory block [TAG][INDEX] in way[WAY] of set[INDEX] of the L1 instruction cache data array 514, the µtag comparator 502 computes a µtag value (expressed herein as the µTAG) for that newly cached memory block. In an embodiment, the µtag comparator 502 computes the µTAG using a hash function that is implemented by a hash function circuit. In an embodiment, the input to the hash function is the TAG of the newly cached memory block. In another embodiment, the input to the hash function is the combined [TAG][INDEX] value of the newly cached memory block. In an embodiment, the computed µTAG is 10 bits in length. The µtag comparator 502 stores the computed µTAG in way[WAY] of set[INDEX] of its µtag array.

When the full tag comparator 512 receives the same {TAG, INDEX, WAY} tuple as a result of the same caching event at the L1 instruction cache 424, the full tag comparator 512 stores the value TAG (a.k.a., the full tag) in way[WAY] of set[INDEX] of its tag array. Thus, the writing of the memory block [TAG][INDEX] by the L2 instruction cache 406IC to the L1 instruction cache 424 results in the following parallel structure: (i) the memory block is cached in way[WAY] of set[INDEX] in the L1 instruction cache data array 514 of the L1 instruction cache 424, (ii) the computed µTAG for the memory block is stored in way[WAY] of set[INDEX] in the µtag array of the µtag comparator 502, and (iii) the value TAG is stored in way[WAY] of set [INDEX] in the tag array of the full tag comparator 512.

The probe buffering unit 422 operates the µtag comparator 502 in various different instances to determine whether an invalidation probe or a memory access request is directed to a memory block that is possibly cached in the L1 instruction cache 424. The µtag comparator 502 does this for incoming invalidation probes from the incoming invalidation probe flow 438, and also for both memory access requests and buffered invalidation probes received from the selection circuit 506.

In each case, the µtag comparator 502 computes an evaluation µtag from the instant memory block—i.e., the memory block to which either the instant invalidation probe or the instant memory access request is directed. In doing so, the µtag comparator 502 uses the same hash function and inputs into that function the same data (e.g., TAG or [TAG] [INDEX]) of the instant memory block that the µtag comparator 502 uses in that embodiment for computing µTAGs for storage in its µtag array upon being notified by the L1 instruction cache 424 of newly cached memory blocks. The µtag comparator 502 then navigates to set[INDEX] in its µtag array—where INDEX is the INDEX value from the instant memory block, and checks for a µtag match between the evaluation µtag and each of the one or more µTAGs (if there are any) that are currently stored in the 8 ways of set[INDEX].

If no µtag match is found in the case of the instant memory block being specified by an invalidation probe, the µtag comparator 502 discards the invalidation probe, and may either not output anything or may output a signal that is indicative of no µtag match being found. In one embodiment, however, even when no µtag match is found in the case of the instant memory block being specified by an invalidation probe, the µtag comparator 502 still transmits to the L1 instruction cache 424 a request that the instant memory block be requested from the L2 instruction cache 406IC.

If no µtag match is found in the case of the instant memory block being specified by a memory access request, the µtag comparator 502 forwards the memory access request to the L1 instruction cache 424. In response, the L1 instruction cache 424 then requests the instant memory block from the L2 instruction cache 406IC.

If at least one µtag match is found, the µtag comparator 502 generates µtag-hit-ways data for the instant invalidation probe or the instant memory access request. In an embodiment, the µtag comparator 502 formulates a byte to express this µtag-hit-ways data, where each 0 or 1 in the formulated byte corresponds respectively to a non-match or match between the evaluation µtag and a respective one of the 8 ways of set[INDEX]. If the instant memory block is specified by an incoming invalidation probe, the µtag comparator 502 outputs both the incoming invalidation probe and the associated µtag-hit-ways data to the invalidation probe buffer 504 via the data link 518. If the instant memory block is specified by a buffered invalidation probe from the selection circuit output 526, the µtag comparator 502 outputs both the buffered invalidation probe and the associated µtag-hit-ways data to the full tag comparator 512 via the data link 533. If the instant memory block is specified by a current memory access request, the µtag comparator 502 outputs both the current memory access request and the associated µtag-hit-ways data to the memory access request comparator 510 via the data link 536.

The invalidation probe buffer 504 can have the capacity to store any number of buffered invalidation probes. In an embodiment, each buffered invalidation probe in the invalidation probe buffer 504 is stored in association with its µtag-hit-ways data as received from the µtag comparator 502 via the data link 518. In an embodiment, the invalidation probe buffer 504 communicates with the memory access request comparator 510 via a data link 530 in order to use the memory access request comparator 510 to compare invalidation probes that arrive via the data link 518 with any already buffered invalidation probes, to avoid buffering duplicate invalidation probes. The invalidation probe buffer 504 provides the buffered-probe flow 524 via the data link 525 to both the selection circuit 506 and the selection logic circuit 508. Buffered invalidation probes can be selected for the buffered-probe flow 524 according to any buffer-maintenance algorithm such as last in first out (LIFO) or first in first out (FIFO), as examples.

The invalidation probe buffer 504 provides probe buffer content data to the memory access request comparator 510 via the data link 530. The probe buffer content data keeps the memory access request comparator 510 informed as to the current contents of the invalidation probe buffer 504. In an embodiment, the invalidation probe buffer 504 sends an incremental update to the memory access request comparator 510 each time the contents of the invalidation probe buffer 504 change. In another embodiment, the invalidation probe buffer 504 sends periodic incremental and/or full probe buffer content updates to the memory access request comparator 510 via the data link 530. In an embodiment, the probe buffer content data includes both the currently buffered invalidation probes (including the memory blocks to which they are respectively directed) and the corresponding µtag-hit-ways data.

The invalidation probe buffer 504 also provides an overflow output 534 via a data link 535 to the L1 instruction cache data array 514 of the L1 instruction cache 424. In an embodiment, upon receiving a most recent invalidation probe from the µtag comparator 502 via the data link 518 and detecting that the invalidation probe buffer 504 is full, the invalidation probe buffer 504 submits, directly to the L1 instruction cache data array 514 via the overflow output 534, either that most recent invalidation probe or an already buffered invalidation probe. In the latter case, the invalidation probe buffer 504 uses an algorithm such as FIFO, random selection, least amount of µtag matching, greatest amount of µtag matching, or the like to determine which buffered invalidation probe to directly submit to the I-cache data array 514. If the invalidation probe buffer 504 does directly submit an already buffered invalidation probe to the L1 instruction cache data array 514, the most recent invalidation probe then occupies a spot in the invalidation probe buffer 504.

In an embodiment, together with the directly submitted invalidation probe, the invalidation probe buffer 504 provides the µtag-hit-ways data for that invalidation probe to the L1 instruction cache data array 514 via the overflow output 534. In an embodiment, the L1 instruction cache 424 applies the directly submitted invalidation probe to each way in the L1 instruction cache data array 514 that possibly contains a memory block to which the directly submitted invalidation probe is directed. The L1 instruction cache 424 does this by navigating to set[INDEX] in the L1 instruction cache data array 514, where INDEX is the INDEX value from the directly submitted invalidation probe, and then invalidates each way in set[INDEX] for which there is a 1 in the µtag-hit-ways data for the directly submitted invalidation probe. The L1 instruction cache 424 also refetches the memory blocks corresponding to each of the invalidated ways from the L2 instruction cache 406IC.

Thus, in this overflow case, it often occurs that one or more ways are invalidated even though those ways do not conclusively—but only possibly—contain a memory block to which the directly submitted invalidation probe is directed. Thus, even in instances when the invalidation probe buffer 504 is full, the present systems and methods perform better than prior implementations that submit all received invalidation probes to the L1 instruction cache, for at least the reason that the directly submitted invalidation probes have been screened by the µtag comparator 502.

When the memory access request comparator 510 receives a current memory access request and associated µtag-hit-ways data via the data link 536 from the µtag comparator 502, the memory access request comparator 510 checks whether there is a buffered cache coherency probe that is directed to the memory block to which the current memory access request is directed. That is, the memory access request comparator 510 compares the memory block to which the current memory access request is directed to the memory block to which each buffered invalidation probe in the invalidation probe buffer 504 is directed, unless and until a match is found. If the memory access request comparator 510 finds a match, the memory access request comparator 510 discards the current memory access request and transmits the matching buffered invalidation probe (and its associated µtag-hit-ways data) to the full tag comparator 512 via the data link 537. If the memory access request comparator 510 does not find a match, the memory access request comparator 510 instead transmits the current memory access request and its associated µtag-hit-ways data to the full tag comparator 512 via the data link 537.

The full tag comparator 512 receives buffered invalidation probes and associated µtag-hit-ways data from the µtag comparator 502 via the data link 533 and from the memory access request comparator 510 via the data link 537. In both cases, the associated µtag-hit-ways data identifies the one or more ways—in the corresponding set in the L1 instruction cache data array 514—that possibly contain the memory block to which the buffered invalidation probe is directed. Each buffered invalidation probe that the full tag comparator 512 receives from the µtag comparator 502 via the data link 533 has (twice) been determined by the µtag comparator 502 to be directed to a memory block that is possibly cached in the L1 instruction cache 424. Each buffered invalidation probe that the full tag comparator 512 receives from the memory access request comparator 510 via the data link 537 has (once) been determined by the µtag comparator 502 to be directed to a memory block that is possibly cached in the L1 instruction cache 424, and has been identified by the memory access request comparator 510 as being directed to the memory block to which a current memory access request is also directed.

Upon receipt of a buffered invalidation probe from either the µtag comparator 502 or the memory access request comparator 510, the full tag comparator 512 navigates to the set[INDEX] in its tag array, where INDEX is taken from the memory block to which the buffered invalidation probe is directed. The full tag comparator 512 checks each way in that set[INDEX] for which there is a corresponding 1 in the µtag-hit-ways data for that buffered invalidation probe. The full tag comparator 512 does so unless and until a match is found between the TAG value of the memory block to which the buffered invalidation probe is directed and a TAG value that is stored in one of those ways in the tag array of the full tag comparator 512. Whenever such a match is found, it is with respect to only one of the ways of that set.

If a matching TAG is found in one of the ways in set[INDEX], the full tag comparator 512 transmits a message via the data link 538 to invalidate that way in that set in the L1 instruction cache data array 514. The L1 instruction cache 424 also requests that memory block from the L2 instruction cache 406IC, and sends a message via the data link 440 to the decode unit 414 to invalidate any pending op cache builds for physical addresses within that memory block. If, however, a matching TAG is not found in any of those ways in set[INDEX], the L1 instruction cache 424 discards that buffered invalidation probe. In some embodiments, the L1 instruction cache 424 still requests the memory block to which the buffered invalidation probe is directed from the L2 instruction cache 406IC.

The full tag comparator 512 also receives current memory access requests and associated µtag-hit-ways data from the memory access request comparator 510 via the data link 537. Each such current memory access request has been determined by the µtag comparator 502 to be directed to a memory block that is possibly cached in the L1 instruction cache 424, and has been identified by the memory access request comparator 510 as being directed to a memory block to which none of the invalidation probes (if any) in the invalidation probe buffer 504 is also directed. Upon receipt of a current memory access request, the full tag comparator 512 navigates to the set[INDEX] in its tag array, where INDEX is taken from the memory block to which the current memory access request is directed.

The full tag comparator 512 checks each way in that set[INDEX] for which there is a corresponding 1 in the µtag-hit-ways data for that current memory access request. The full tag comparator 512 does so unless and until a match is found between the TAG value of the memory block to which the current memory access request is directed and a TAG value that is stored in one of those ways in the tag array of the full tag comparator 512. Whenever such a match is found, it is with respect to only one of the ways of that set.

If a matching TAG is found in one of the ways in set[INDEX], the full tag comparator 512 transmits a message via the data link 538 to the L1 instruction cache data array 514, where that message includes the current memory access request and identifies the particular way in set[INDEX] in which a matching TAG was found. Upon receipt of that message, the L1 instruction cache data array 514 navigates to the set[INDEX] where INDEX is taken from the memory block to which the current memory access request is directed, and navigates to the way that was identified by the full tag comparator 512. From that identified way, the L1 instruction cache 424 fetches or reads out the entire memory block and uses the OFFSET field of the physical address to which the current memory access request is directed to provide a subset of the memory block to the decode unit 414 via the data link 440. If, however, a matching TAG is not found in any of the ways in set [INDEX], the L1 instruction cache 424 requests the corresponding memory block from the L2 instruction cache 406IC.

In an embodiment, an in-flight tracker 516 also receives the incoming invalidation probe flow 438 via the data link 439. The in-flight tracker 516 checks for matches between the memory blocks to which the invalidation probes in the incoming invalidation probe flow 438 are directed and the memory blocks to which instructions that the instruction pipeline 404 has placed in-flight and that have not yet been retired are directed. Upon identifying a match, the in-flight tracker 516 conveys the necessary messaging via a data link 542 to trigger a resync of the core 402. In some implementations, the in-flight tracker 516 may be referred to as a branch shift register (BSR).

III. Example Operation

A. Example Selection Logic

Figure 6:
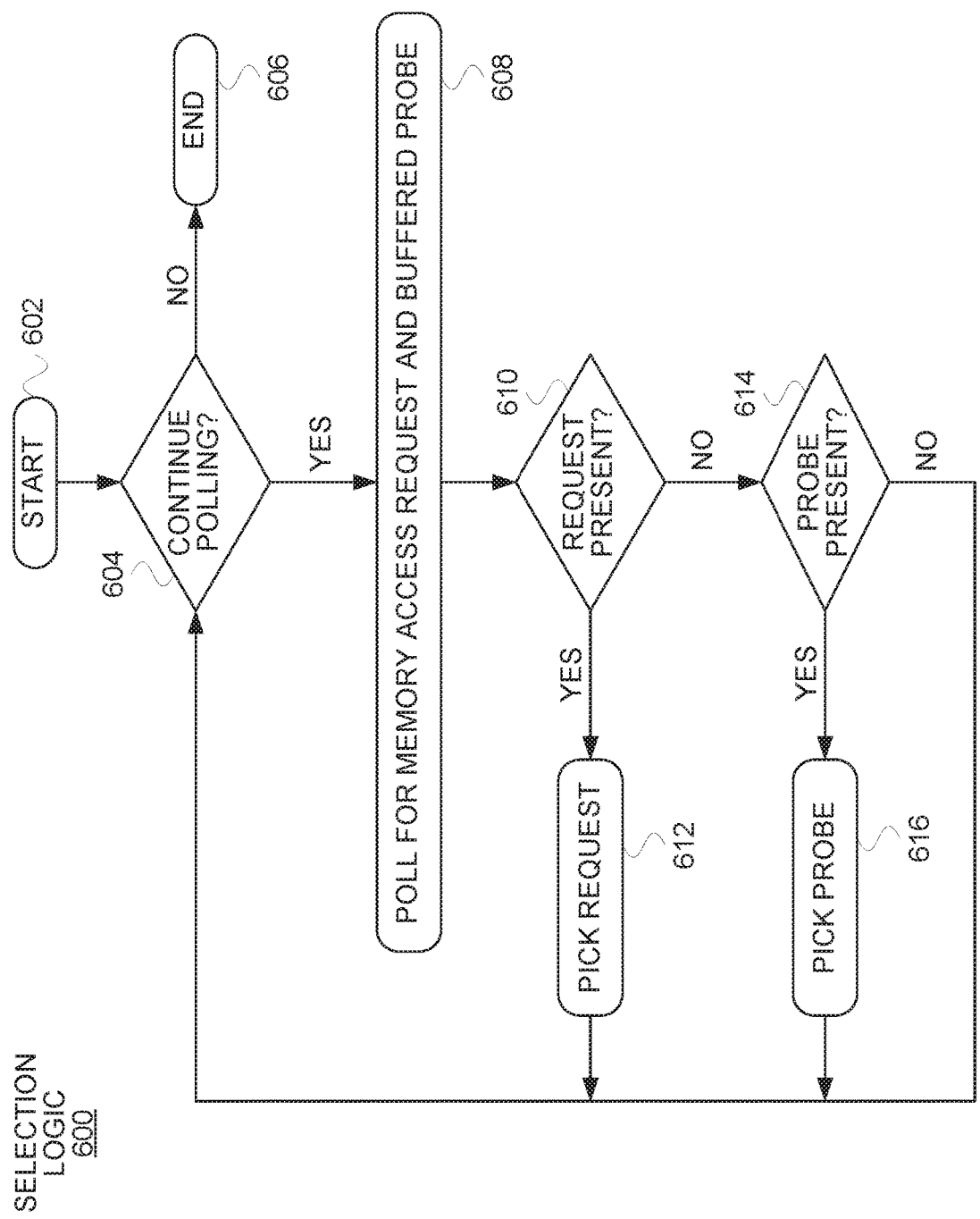
FIG. 6 depicts example selection logic, implemented by the example probe buffering unit of FIG. 4, for selectively picking a current memory access request or a buffered invalidation probe for processing to a cache, in accordance with an embodiment.

FIG. 6 depicts example selection logic 600, which is implemented in an embodiment by the selection logic circuit 508 for selectively picking a current memory access request from the memory access request flow 428 or a buffered invalidation probe from the buffered-probe flow 524 for processing to the L1 instruction cache 424. The selection logic 600 starts at step 602, and then at step 604, the selection logic circuit 508 checks whether to continue the polling operation. Step 604 provides an opportunity for the probe buffering unit 422 and/or one or more other components of the core 402 to stop the execution of the selection logic 600 using an interrupt signal, an abort message, or the like.

If the selection logic circuit 508 determines at step 604 to not continue polling, then at step 606 the selection logic circuit 508 terminates the execution of the selection logic 600. If, however, the selection logic circuit 508 determines at step 604 to continue polling, control then passes to step 608, at which the selection logic circuit 508 polls (i) the first selection logic circuit input 554 for the presence of a current memory access request from the memory access request flow 428 and (ii) the second selection logic circuit input 556 for the presence of a buffered invalidation probe from the buffered-probe flow 524.

Control then passes to step 610, at which the selection logic circuit 508 checks whether a current memory access request is present at the first selection logic circuit input 554. If the selection logic circuit 508 determines at step 610 that a current memory access request is present at the first selection logic circuit input 554, control then passes to step 612, at which the selection logic circuit 508 instructs the selection circuit 506 to pick that current memory access request from the first selection circuit input 550 for processing. Control then returns to step 604. If, however, the selection logic circuit 508 determines at step 610 that a current memory access request is not present at the first selection logic circuit input 554, control then passes to step 614.

At step 614, the selection logic circuit 508 checks whether a buffered invalidation probe is present at the second selection logic circuit input 556. If the selection logic circuit 508 determines at step 614 that a buffered invalidation probe is present at the second selection logic circuit input 556, control then passes to step 616, at which the selection logic circuit 508 instructs the selection circuit 506 to pick that buffered invalidation probe from the second selection circuit input 552 for processing. Control then returns to step 604. If, however, the selection logic circuit 508 determines at step 614 that a buffered invalidation probe is not present at the second selection logic circuit input 556, then control returns to step 604. In one embodiment, in addition to the memory access request flow 428 and the buffered-probe flow 524, there is also a forced information tag flow for urgent μtag array access requests, which takes priority over both the memory access request flow 428 and the buffered-probe flow 524.

B. Example Method

FIG. 7 depicts an example method 700, carried out by an example probe buffering unit, of selectively filtering, buffering, and processing cache coherency probes. At step 702, the probe buffering unit receives cache coherency probes and memory access requests for a cache of a processor. The cache coherency probes and the memory access requests are directed to respective memory blocks of a memory. At step 704, the probe buffering unit identifies and discards any of the cache coherency probes that are directed to a memory block that is not cached in the cache. At step 706, the probe buffering unit buffers at least a subset of the remaining cache coherency probes in a cache coherency probe buffer of the probe buffering unit. At step 708, the probe buffering unit submits to the cache, in descending order of priority, one or more of: any buffered cache coherency probes that are directed to the memory block to which a current memory access request is also directed, any current memory access requests that are directed to a memory block to which there is not a buffered cache coherency probe also directed, and any buffered cache coherency probes when there is not a current memory access request.

C. Example Probe Handling Logic

Figure 8:
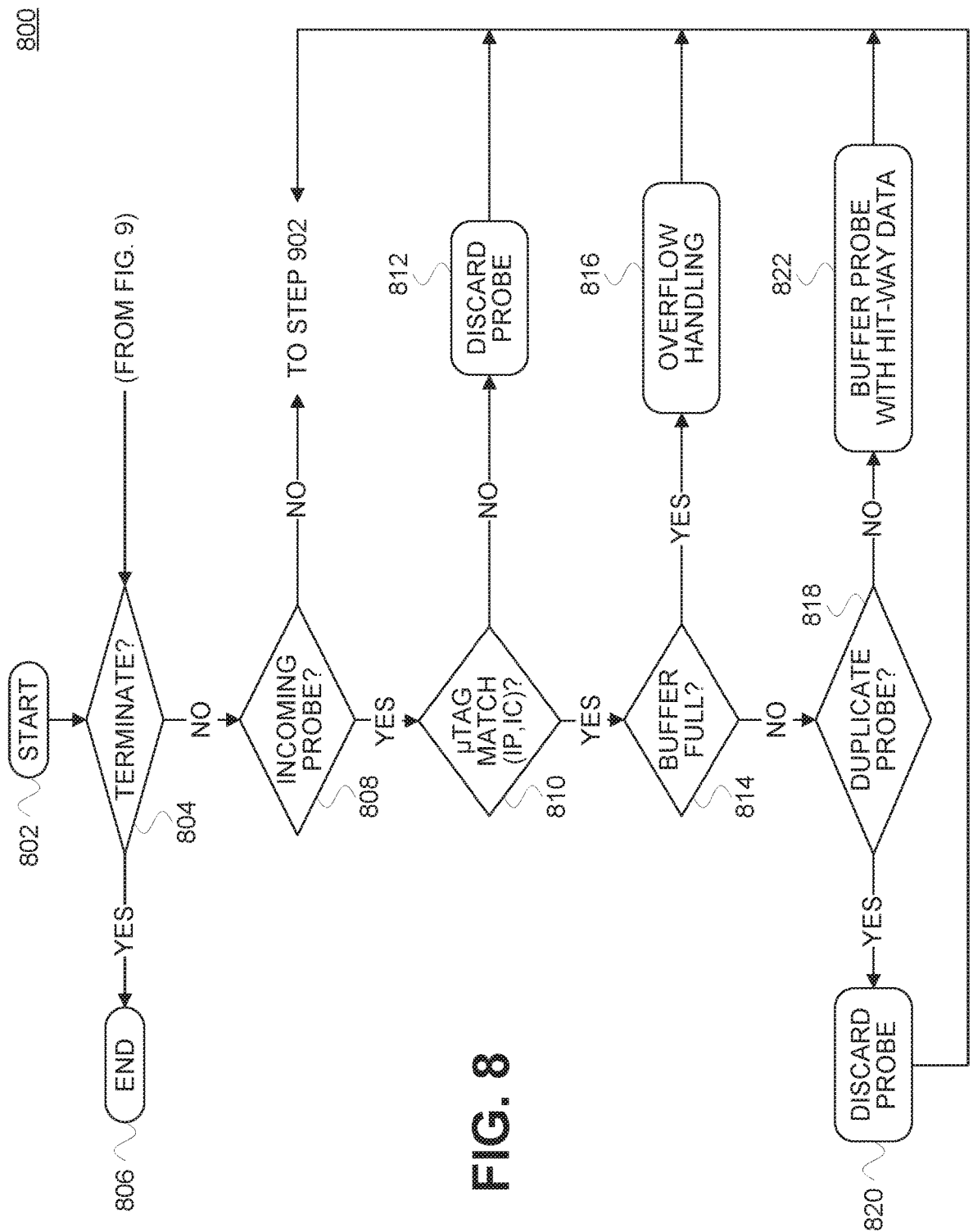
FIG. 8 depicts the first of two parts of a flowchart of example probe handling logic implemented by the example processor of FIG. 1, for selectively filtering, buffering, and processing cache coherency probes, in accordance with an embodiment.

FIGS. 8 and 9 depict first and second parts of a flowchart of example probe handling logic 800, implemented by the processor 102 in an embodiment, for selectively filtering, buffering, and processing cache coherency probes. Some steps of the probe handling logic 800 are carried out by the probe buffering unit 422, and others are carried out by the L1 instruction cache 424. Where applicable, particular components of the probe buffering unit 422 or the L1 instruction cache 424 are recited by way of example as carrying out particular steps.

The probe handling logic 800 begins at step 802. Control then passes to step 804, at which the probe buffering unit 422 determines whether to terminate execution of the probe handling logic 800. In an embodiment, the probe buffering unit 422 determines whether it has received an abort command, a termination instruction, or another similar message from another component of the processor 102 or from another processor or device. If the probe buffering unit 422 determines at step 804 to terminate execution of the probe handling logic 800, then execution of the probe handling logic 800 ends at step 806. If, however, the probe buffering unit 422 determines at step 804 to not terminate execution of the probe handling logic 800, control passes to step 808.

At step 808, the probe buffering unit 422 determines whether an incoming invalidation probe from the incoming invalidation probe flow 438 is present at an input of the μtag comparator 502 that is communicatively connected to the data link 439. If so, control passes to step 810. If not, control passes to step 902 of FIG. 9.

At step 810, the μtag comparator 502 checks whether there is a μtag match between the incoming invalidation probe (abbreviated "IP" in FIG. 8) and the L1 instruction cache 424 (abbreviated "IC" in FIGS. 8 and 9). The μtag comparator 502 checks whether an evaluation μtag that the μtag comparator 502 computes based on the incoming invalidation probe matches one or more of the μtags stored in the corresponding set in the μtag array that is maintained by the μtag comparator 502.

If, at step 810, the μtag comparator 502 does not identify a μtag match between the incoming invalidation probe and the L1 instruction cache 424, control passes to step 812, at which the probe buffering unit 422 discards the incoming invalidation probe. In some embodiments, step 812 also includes the L1 instruction cache 424 requesting, from the L2 instruction cache 4061C, the memory block to which that invalidation probe is directed. After step 812, control passes to step 902. If, however, at step 810, the μtag comparator 502 does identify a μtag match between the incoming invalidation probe and the L1 instruction cache 424, control passes to step 814, at which the probe buffering unit 422 determines whether or not the invalidation probe buffer 504 is full. If the invalidation probe buffer 504 is full, control passes to step 816. If the invalidation probe buffer 504 is not full, control passes to step 818.

At step 816, the probe buffering unit 422 carries out overflow handling. As part of step 816, the invalidation probe buffer 504 submits either the incoming invalidation probe or an already buffered invalidation probe to the L1 instruction cache data array 514, along with the associated µtag-hit-ways data. If the invalidation probe buffer 504 submits an already buffered invalidation probe to the L1 instruction cache data array 514, the incoming invalidation probe then occupies a spot in the invalidation probe buffer 504. The L1 instruction cache 424 applies the directly submitted invalidation probe to each way in the L1 instruction cache data array 514 that possibly contains a memory block to which the directly submitted invalidation probe is directed. The L1 instruction cache 424 invalidates each such way and refetches the one more corresponding memory blocks from the L2 instruction cache 406IC. After step 816, control passes to step 902.

At step 818, the probe buffering unit 422 checks whether the incoming invalidation probe is a duplicate of an invalidation probe that is already buffered in the invalidation probe buffer 504. If it is determined at step 818 that the incoming invalidation probe is a duplicate, control passes to step 820, at which the probe buffering unit 422 discards the incoming invalidation probe, and then passes to step 902. If, however, it is determined at step 818 that the incoming invalidation probe is not a duplicate, control passes to step 822. At step 822, the probe buffering unit 422 buffers the incoming invalidation probe in the invalidation probe buffer 504 together with the associated µtag-hit-ways data as determined by the µtag comparator 502. Control then passes to step 902.

Referring now to FIG. 9, at step 902, the selection logic circuit 508 polls the first selection logic circuit input 554 for the presence of a current memory access request and the second selection logic circuit input 556 for the presence of a buffered invalidation probe. Control then passes to step 904, at which the selection logic circuit 508 determines whether there is a current memory access request present at the first selection logic circuit input 554. If there is, control passes to step 906. If there is not, control passes to step 934.

At step 906, the µtag comparator 502 checks whether there is a µtag match between the current memory access request (abbreviated "R" in FIG. 9) and the L1 instruction cache 424. The µtag comparator 502 checks whether an evaluation µtag that the µtag comparator 502 computes based on the current memory access request matches one or more of the µtags stored in the corresponding set in the µtag array that is maintained by the µtag comparator 502. If, at step 906, the µtag comparator 502 does not identify a µtag match between the current memory access request and the L1 instruction cache 424, control passes to step 908. If, however, at step 906, the µtag comparator 502 does identify a µtag match between the current memory access request and the L1 instruction cache 424, the µtag comparator 502 transmits the current memory access request and its associated µtag-hit-ways data to the memory access request comparator 510 via the data link 536, and control then passes to step 912.

At step 908, the µtag comparator 502 submits the current memory access request to the L1 instruction cache 424 via the data link 533. Control then passes to step 910, at which the L1 instruction cache 424 requests—from the L2 instruction cache 406IC—the memory block to which the current memory access request is directed. Control then passes to step 804 of FIG. 8.

At step 912, the memory access request comparator 510 checks whether there is a buffered invalidation probe (abbreviated "PRB" in FIG. 9) that is directed to the memory block to which the current memory access request is directed. If, at step 912, the memory access request comparator 510 does not find a matching buffered invalidation probe, control passes to step 914, at which the memory access request comparator 510 transmits the current memory access request and its µtag-hit-ways data to the full tag comparator 512 via the data link 537. Control then passes to step 916.

At step 916, the full tag comparator 512 checks whether there is a full tag match between the current memory access request and the L1 instruction cache 424. The full tag comparator 512 compares the TAG from the current memory access request to the TAG stored in each way (in the corresponding set) for which there is a 1 in the µtag-hit-ways data for the current memory access request. If the full tag comparator 512 does not find a full tag match, control passes to step 910, and then to step 804. If, however, the full tag comparator 512 does find a full tag match in a particular way of the corresponding set in the tag array, the full tag comparator 512 transmits the current memory access request and the particular way to the L1 instruction cache data array 514 via the data link 538, and control then passes to step 918.

At step 918, the L1 instruction cache 424 navigates in the L1 instruction cache data array 514 to the set[INDEX] where INDEX is taken from the memory block to which the current memory access request is directed, and navigates to the way that was identified by the full tag comparator 512 in step 916. From that identified way, the L1 instruction cache 424 fetches or reads out the entire memory block and uses the OFFSET field of the physical address to which the current memory access request is directed to provide a subset of the cacheline to the decode unit 414 via the data link 440

If, at step 912, the memory access request comparator 510 does find a matching buffered invalidation probe—i.e., a buffered invalidation probe that is directed to the memory block to which the current memory access request is directed, control passes to step 920, at which the probe buffering unit 422 discards the current memory access request. Control then passes to step 922, at which the memory access request comparator 510 submits the matching buffered invalidation probe that was identified at step 912 to the full tag comparator 512 of the L1 instruction cache 424 via the data link 537. Control then passes to step 924.

At step 924, the full tag comparator 512 checks whether there is a full tag match between the matching buffered invalidation probe that was identified at step 912 and the L1 instruction cache 424. The full tag comparator 512 compares the TAG of the memory block to which the matching buffered invalidation probe is directed to the TAG stored in each way (in the corresponding set) for which there is a 1 in the µtag-hit-ways data for the matching buffered invalidation probe. If the full tag comparator 512 does not find a full tag match, control passes to step 926, at which the L1 instruction cache 424 discards that invalidation probe, and control then passes to step 804. If, however, the full tag comparator 512 does find a full tag match in a particular way of the corresponding set in the tag array, the full tag comparator 512 transmits the matching buffered invalidation probe and the particular way to the L1 instruction cache data array 514 via the data link 538, and control then passes to step 928.

At step 928, the L1 instruction cache data array 514 navigates to the set indicated by the INDEX field of the memory block to which the invalidation probe—received by the L1 instruction cache data array 514 from the full tag comparator 512—is directed, and invalidates (e.g., by flipping a valid bit from 1 to 0) the particular way specified by the full tag comparator 512. The L1 instruction cache 424 then updates the full tag comparator 512 and the µtag comparator 502 accordingly, so that those entities can update their respective arrays. Control then passes to step 930, at which the L1 instruction cache 424 requests—from the L2 instruction cache 406IC—the memory block to which the invalidation probe is directed, and then to step 932, at which the L1 instruction cache 424 transmits a command via the data link 440 to the decode unit 414, instructing the decode unit 414 to cancel any pending op cache builds that are directed to a physical address within the memory block to which that invalidation probe is directed. Control then passes to step 804.

Returning now to step 934, to which control passes if the selection logic circuit 508 determines at step 904 that a current memory access request is not present at the first selection logic circuit input 554, the selection logic circuit 508 checks whether there is a buffered invalidation probe present at the second selection logic circuit input 556. If not, control passes to step 804. If so, the selection circuit forwards the present buffered invalidation probe to the µtag comparator 502, and control passes to step 936.

At step 936, the µtag comparator 502 checks whether there is a µtag match between the present buffered invalidation probe and the L1 instruction cache 424. The µtag comparator 502 checks whether an evaluation µtag that the µtag comparator 502 computes based on the present buffered invalidation probe matches one or more of the µtags stored in the corresponding set in the µtag array that is maintained by the µtag comparator 502.

If, at step 936, the µtag comparator 502 does not identify a µtag match between the present buffered invalidation probe and the L1 instruction cache 424, control passes to step 938, at which the probe buffering unit 422 discards the present buffered invalidation probe, and then to step 804. In an embodiment, when a µtag match is not found at step 936, the probe buffering unit 422 also requests that the L1 instruction cache 424 fetch, from the L2 instruction cache 406IC, the memory block to which the present buffered invalidation probe is directed. If, however, at step 936, the µtag comparator 502 does identify a µtag match between the present buffered invalidation probe and the L1 instruction cache 424, control passes to step 940, at which the µtag comparator 502 transmits the present buffered invalidation probe and its associated µtag-hit-ways data to the full tag comparator 512 via the data link 533. Control then passes to step 942.

At step 942, the full tag comparator 512 checks for a full tag match between the present buffered invalidation probe and the L1 instruction cache 424. If, at step 942, the full tag comparator 512 does not identify a full tag match between the present buffered invalidation probe and the L1 instruction cache 424, control passes to step 938, and then to step 804. In an embodiment, when a full tag match is not found at step 942, the probe buffering unit 422 also requests that the L1 instruction cache 424 fetch, from the L2 instruction cache 406IC, the memory block to which the present buffered invalidation probe is directed. If, at step 942, the full tag comparator 512 does identify a full tag match in a particular way of the corresponding set in the tag array, the full tag comparator 512 transmits the present buffered invalidation probe and the particular way to the L1 instruction cache data array 514 via the data link 538, and control then passes to the sequence of step 928, step 930, and step 932, and then to step 804.

IV. Additional Embodiments

A. Optional First and Second Sub-Circuits

In an embodiment, the probe buffering unit 422 receives the memory access request flow 428 via the data link 429, the incoming invalidation probe flow 438 via the data link 439, and the L1 instruction cache content data 544 via the data link 545. The probe buffering unit 422 includes the µtag comparator 502, the invalidation probe buffer 504, the data link 518, and the data link 535. It is the µtag comparator 502 that receives the incoming invalidation probe flow 438 via the data link 439 as well as the L1 instruction cache content data 544 via the data link 545, and that communicates with the invalidation probe buffer 504 via the data link 518. The invalidation probe buffer 504 also transmits the overflow output 534 to the L1 instruction cache 424 via the data link 535. In an embodiment, the probe buffering unit 422 also includes a first sub-circuit and a second sub-circuit.

The first sub-circuit uses available timeslots in the memory access request flow 428 to process buffered invalidation probes from the invalidation probe buffer 504, and the second sub-circuit acts as a gatekeeper to prevent the submission to the L1 instruction cache 424 of any current memory access requests that are directed to a memory block to which at least one buffered invalidation probe in the invalidation probe buffer 504 is also directed. The first sub-circuit includes the selection circuit 506, the selection logic circuit 508, the buffered-probe flow 524, the selection circuit output 526, the selection circuit control signal 528, the first selection circuit input 550, the second selection circuit input 552, the first selection logic circuit input 554, and the second selection logic circuit input 556. The second sub-circuit includes the memory access request comparator 510, the data link 530, the data link 533, the data link 536, and the data link 537.

In an embodiment, the first sub-circuit is present but the second sub-circuit is not. As compared with the embodiment of FIG. 5, more memory access requests that match buffered invalidation probes get through to the L1 instruction cache 424, resulting in an increased number of resyncs. Indeed, in this embodiment, only when an available timeslot in the memory access request flow 428 occurs do any buffered invalidation probes get processed to the L1 instruction cache 424. Thus, this embodiment does not handle the overlap case that is handled by the embodiment of FIG. 5—i.e., this embodiment does not prevent the submission to the L1 instruction cache 424 of current memory access requests that are directed to the same memory block as (i.e., that overlap) a buffered invalidation probe in the invalidation probe buffer 504. It can happen that there is an available timeslot in the memory access request flow 428 and the correct buffered invalidation probe happens to be processed from the invalidation probe buffer 504 before the overlapping current memory access request comes in, though this is not a true example of overlap, since that buffered invalidation probe had already been processed to the L1 instruction cache 424 prior to the arrival of that memory access request.

In another embodiment, conversely, the second sub-circuit is present but the first sub-circuit is not. Thus, this embodiment includes the memory access request comparator 510 to handle the overlap case but does not include the first sub-circuit to use available timeslots in the memory access request flow 428 to process buffered invalidation probes out of the invalidation probe buffer 504. In this embodiment, again as compared with the embodiment of FIG. 5, only overlap cases are handled, so the L1 instruction cache 424 stays more full than it otherwise would with invalid instructions, rendering it an underused resource for the processor 102. In this embodiment, however, resyncs are prevented for overlapped probes that happen to be in the invalidation probe buffer 504 at the time that the overlapping current memory access request arrives, though the invalidation probe buffer 504 itself (if it does not implement a replacement scheme such as aging out buffered probes) fills up and only occasionally has an empty spot for a new invalidation probe—in other words, if the invalidation probe buffer 504 does not implement a replacement scheme, invalidation probes come in to the invalidation probe buffer 504 and never get out unless they happen to be overlapped by a current memory access request.

B. Computer Readable Medium Containing Integrated Circuit Fabrication Instructions Various embodiments take the form of a non-transitory CRM containing instructions executable by an IC manufacturing system to fabricate any of the described embodiments of the processor 102. As examples, the instructions contained on the CRM can take the form of or include one or more of (i) a register transfer level (RTL) representation, (ii) high level design language (HDL) (a.k.a. hardware description code) instructions in a language such as Analog HDL (AHDL), Verilog HDL, SystemVerilog HDL, or Very High Speed Integrated Circuits (VHSIC) Hardware Description Language (VHDL), (iii) code in a higher level or modeling language such as C, C++, SystemC, Simulink, or MATLAB, and (iv) physical layout code such as Graphic Database System II (GDSII) code.

C. Memory Read Requests and Memory Write Requests

In some embodiments, the received memory access requests include both memory read requests and memory write requests. In an embodiment, the cache is a data cache. In an embodiment, memory write requests that are picked by the selection logic circuit 508 for processing bypass the µtag comparator 502 and are routed directly to the corresponding cache, while memory read requests that are picked by the selection logic circuit 508 for processing are routed to the µtag comparator 502 for µtag screening. In another embodiment, both memory write requests and memory read requests that are picked by the selection logic circuit 508 for processing are routed via the µtag comparator 502, but the memory write requests pass through the µtag comparator 502 without undergoing µtag screening while the memory read requests do undergo µtag screening by the µtag comparator 502. In an embodiment, memory write requests are checked by the memory access request comparator 510 for a full tag match with a buffered probe. Upon a full tag match being identified, the memory write request is discarded in favor of processing the matching buffered probe.

What is claimed is:

1. A method, carried out by one or more processors, the method comprising:
    receiving, at a probe buffering unit of a processor, cache coherency probes and memory access requests for a cache of the processor, wherein the cache coherency probes and the memory access requests are directed to respective memory blocks of a memory;
    the probe buffering unit identifying and discarding any of the cache coherency probes that are directed to a memory block that is not cached in the cache;
    the probe buffering unit buffering at least a subset of the remaining cache coherency probes in a cache coherency probe buffer of the probe buffering unit; and
    the probe buffering unit submitting to the cache, in descending order of priority, one or more of:
        any buffered cache coherency probes that are directed to the memory block to which a current memory access request is also directed;
        any current memory access requests that are directed to a memory block to which there is not a buffered cache coherency probe also directed; and
        any buffered cache coherency probes when there is not a current memory access request.

2. The method of claim 1, wherein the submitting step comprises iteratively:
    polling for a current memory access request at a first input of a selection circuit of the probe buffering unit and for a buffered cache coherency probe at a second input of the selection circuit;
    if the polling indicates the presence of a current memory access request at the first input, then picking the current memory access request from the first input for processing; and
    if the polling does not indicate the presence of a current memory access request at the first input but does indicate the presence of a buffered cache coherency probe at the second input, then picking the present buffered cache coherency probe from the second input for processing.

3. The method of claim 2, wherein processing the current memory access request comprises:
    if the current memory access request is directed to a memory block that is possibly cached in the cache, then:
        if there is a buffered cache coherency probe that is directed to the memory block to which the current memory access request is directed, then:
            discarding the current memory access request; and
            transmitting that buffered cache coherency probe to the cache; and
        if there is not a buffered cache coherency probe that is directed to the memory block to which the current memory access request is directed, then transmitting the current memory access request to the cache; and
    if the current memory access request is directed to a memory block that is not cached in any of the cache lines, then transmitting the current memory access request to the cache.

4. The method of claim 2, wherein processing the present buffered cache coherency probe comprises transmitting the present buffered cache coherency probe from the selection circuit to the cache.

5. The method of claim 2, wherein processing the present buffered cache coherency probe comprises:
    if the present buffered cache coherency probe is directed to a memory block that is possibly cached in the cache, then transmitting the present buffered cache coherency probe to the cache; and
    if the present buffered cache coherency probe is directed to a memory block that is not cached in the cache, then discarding the present buffered cache coherency probe.

6. The method of claim 1, further comprising operating a memory access request comparator to determine whether there is a buffered cache coherency probe that is directed to the memory block to which a current memory access request is directed.

7. The method of claim 1, further comprising:
upon identification of a most recent cache coherency probe that is directed to a memory block that is possibly cached in the cache, detecting that the cache coherency probe buffer is full, and responsively submitting directly to the cache either the most recent cache coherency probe or an already buffered cache coherency probe for application by the cache of the directly submitted cache coherency probe to any storage segments of the cache that possibly contain the memory block to which the directly submitted cache coherency probe is directed.

8. The method of claim 1, further comprising operating a microtag comparator to determine whether a cache coherency probe is directed to a memory block that is possibly cached in the cache or instead to a memory block that is not cached in the cache.

9. A processor comprising:
a memory;
a cache for caching memory blocks of the memory; and
a probe buffering unit that comprises a cache coherency probe buffer, wherein the probe buffering unit is configured to:
receive cache coherency probes and memory access requests for the cache, wherein the cache coherency probes and the memory access requests are directed to respective memory blocks of the memory;
identify and discard any of the cache coherency probes that are directed to a memory block that is not cached in the cache;
buffer at least a subset of the remaining cache coherency probes in the cache coherency probe buffer; and
submit to the cache, in descending order of priority, one or more of:
any buffered cache coherency probes that are directed to the memory block to which a current memory access request is also directed;
any current memory access requests that are directed to a memory block to which there is not a buffered cache coherency probe also directed; and
any buffered cache coherency probes when there is not a current memory access request.

10. The processor of claim 9, wherein the probe buffering unit further comprises:
a selection circuit having a first selection circuit input and a second selection circuit input; and
a selection logic circuit having a first selection logic circuit input and a second selection logic circuit input, wherein the probe buffering unit is configured to:
receive, into both the first selection circuit input and the first selection logic circuit input, a memory access request flow comprising the received memory access requests;
receive, into both the second selection circuit input and the second selection logic circuit input, a second flow comprising the buffered cache coherency probes; and
carry out the submitting step at least in part by operating the selection logic circuit to iteratively:
poll for a current memory access request at the first selection logic circuit input and for a buffered cache coherency probe at the second selection logic circuit input;
if the polling indicates the presence of a current memory access request at the first selection logic circuit input, then control the selection circuit to pick the current memory access request from the first selection circuit input for processing; and
if the polling does not indicate the presence of a current memory access request at the first selection logic circuit input but does indicate the presence of a buffered cache coherency probe at the second selection logic circuit input, then control the selection circuit to pick the present buffered cache coherency probe from the second selection circuit input for processing.

11. The processor of claim 10, wherein:
the probe buffering unit further comprises a microtag (μtag) comparator and a memory access request comparator; and
the probe buffering unit is further configured to process the current memory access request by:
operating the μtag comparator to determine whether the current memory access request is directed to a memory block that is possibly cached in the cache or instead to a memory block that is not cached in the cache;
if the current memory access request is directed to a memory block that is possibly cached in the cache, then:
operating the memory access request comparator to determine whether there is a buffered cache coherency probe that is directed to the memory block to which the current memory access request is directed;
if there is a buffered cache coherency probe that is directed to the memory block to which the current memory access request is directed, then:
discarding the current memory access request; and
transmitting that buffered cache coherency probe to the cache; and
if there is not a buffered cache coherency probe that is directed to the memory block to which the current memory access request is directed, then transmitting the current memory access request to the cache; and
if the current memory access request is directed to a memory block that is not cached in the cache, then transmitting the current memory access request to the cache.

12. The processor of claim 10, wherein the probe buffering unit is further configured to process the present buffered cache coherency probe by transmitting the present buffered cache coherency probe from the selection circuit to the cache.

13. The processor of claim 10, wherein:
the probe buffering unit further comprises a microtag (μtag) comparator; and
the probe buffering unit is further configured to process the present buffered cache coherency probe by:
operating the μtag comparator to determine whether the present buffered cache coherency probe is directed to a memory block that is possibly cached in the cache or instead to a memory block that is not cached in the cache;
if the present buffered cache coherency probe is directed to a memory block that is possibly cached in the cache, then transmitting the present buffered cache coherency probe to the cache; and
if the present buffered cache coherency probe is directed to a memory block that is not cached in the cache, then discarding the present buffered cache coherency probe.

14. The processor of claim 9, wherein:
the probe buffering unit further comprises a memory access request comparator; and
the probe buffering unit is further configured to operate the memory access request comparator to determine whether there is a buffered cache coherency probe that is directed to the memory block to which a current memory access request is also directed.

15. The processor of claim 9, wherein the probe buffering unit is further configured to:
upon identification of a most recent cache coherency probe that is directed to a memory block that is possibly cached in the cache, detect that the cache coherency probe buffer is full, and responsively submit directly to the cache either the most recent cache coherency probe or an already buffered cache coherency probe for application by the cache of the directly submitted cache coherency probe to any storage segments of the cache that possibly contain the memory block to which the directly submitted cache coherency probe is directed.

16. The processor of claim 9, wherein:
the probe buffering unit further comprises a microtag (µtag) comparator; and
the probe buffering unit is further configured to operate the µtag comparator to determine whether a cache coherency probe is directed to a memory block that is possibly cached in the cache or instead to a memory block that is not cached in the cache.

17. A non-transitory computer readable medium containing instructions executable by an integrated circuit manufacturing system to fabricate a processor comprising:
a memory;
a cache for caching memory blocks of the memory; and
a probe buffering unit that comprises a cache coherency probe buffer, wherein the probe buffering unit is configured to:
receive cache coherency probes and memory access requests for the cache, wherein the cache coherency probes and the memory access requests are directed to respective memory blocks of the memory;
identify and discard any of the cache coherency probes that are directed to a memory block that is not cached in the cache;
buffer at least a subset of the remaining cache coherency probes in the cache coherency probe buffer; and
submit to the cache, in descending order of priority, one or more of:
any buffered cache coherency probes that are directed to the memory block to which a current memory access request is also directed;
any current memory access requests that are directed to a memory block to which there is not a buffered cache coherency probe also directed; and
any buffered cache coherency probes when there is not a current memory access request.

18. A processor comprising:
a memory;
an instruction cache for caching memory blocks of the memory; and
a probe buffering unit that comprises an invalidation probe buffer, wherein the probe buffering unit is configured to:
receive self modifying code (SMC) invalidation probes and memory access requests for the instruction cache, wherein the SMC invalidation probes and the memory access requests are directed to respective memory blocks of the memory;
identify and discard any of the SMC invalidation probes that are directed to a memory block that is not cached in the cache;
buffer at least a subset of the remaining SMC invalidation probes in the invalidation probe buffer; and
submit to the instruction cache, in descending order of priority, one or more of:
any buffered SMC invalidation probes that are directed to the memory block to which a current memory access request is also directed;
any current memory access requests that are directed to a memory block to which there is not a buffered SMC invalidation probe also directed; and
any buffered SMC invalidation probes when there is not a current memory access request.

19. The processor of claim 18, wherein:
the probe buffering unit further comprises a memory access request comparator; and
the probe buffering unit is further configured to operate the memory access request comparator to determine whether there is a buffered invalidation probe that is directed to the memory block to which a current memory access request is also directed.

20. The processor of claim 18, wherein:
the probe buffering unit further comprises a microtag (µtag) comparator; and
the probe buffering unit is further configured to operate the µtag comparator to determine whether an invalidation probe is directed to a memory block that is possibly cached in the instruction cache or instead to a memory block that is not cached in the instruction cache.

\* \* \* \* \*